(12) United States Patent
Powell

(10) Patent No.: US 7,240,023 B1
(45) Date of Patent: *Jul. 3, 2007

(54) SYSTEM AND METHOD FOR DISTRIBUTING COUPONS THROUGH A SYSTEM OF COMPUTER NETWORKS

(75) Inventor: Ken R. Powell, Athens, GA (US)

(73) Assignee: SoftCard Systems, Inc., Watkinsville, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/495,483

(22) Filed: Feb. 1, 2000

Related U.S. Application Data

(63) Continuation of application No. 09/245,419, filed on Feb. 5, 1999, now Pat. No. 6,067,526, which is a continuation of application No. 09/100,868, filed on Jun. 22, 1998, now Pat. No. 6,012,038, which is a continuation of application No. 08/603,482, filed on Feb. 20, 1996, now Pat. No. 5,806,044.

(51) Int. Cl.
G06Q 30/00 (2006.01)
G07G 1/14 (2006.01)

(52) U.S. Cl. .................. 705/14; 370/389; 370/392; 709/238

(58) Field of Classification Search ............ 705/14, 705/1, 10, 16; 370/392, 351, 389; 709/230, 709/238; 395/200.6, 200.68
See application file for complete search history.

(56) References Cited

U.S. PATENT DOCUMENTS

| | | | | |
|---|---|---|---|---|
| 3,622,995 A | * | 11/1971 | Dilks et al. .................. 235/382 |
| 3,959,624 A | | 5/1976 | Kaslow | |
| 4,882,675 A | | 11/1989 | Nichtberger et al. | |
| 4,982,346 A | * | 1/1991 | Girouard et al. ............... 705/14 |
| 5,122,643 A | | 6/1992 | Gamou et al. | |
| 5,176,224 A | | 1/1993 | Spector et al. | |
| 5,249,044 A | | 9/1993 | Von Kohorn et al. | |
| 5,353,218 A | | 10/1994 | De Lapa et al. | |
| 5,380,991 A | | 1/1995 | Valencia et al. | |

(Continued)

FOREIGN PATENT DOCUMENTS

EP 0612019 A2 * 8/1994
JP 03-71290 A 3/1991

OTHER PUBLICATIONS

Marthn Williams, "UK's GPT To Supply First Smart Card Phone to China", Oct. 10, 1995, Newsbytes News Networks, 2 pages.*
Alan Mitchell, "Marketing's Smart Transformation", Marketing, May 21, 1992, 6 pages.*
U.S. Appl. No. 08/466,270, filed Jun. 6, 1995, Narasimhan et al.
T. Berners–Lee and D. Connolly; RFC 1866. Proposed Standard "HyperText Markup Language Specification—2.0"; Nov. 1995; pp. 1–3, and 40–49.
U.S. Appl. No. 60/009,244, filed Dec. 26, 1995, Scroggie et al.

(Continued)

Primary Examiner—John W. Hayes
Assistant Examiner—Shannon S. Saliard
(74) Attorney, Agent, or Firm—Jackson Patent Law Office

(57) ABSTRACT

A system for dispensing and redeeming the electronic discount coupons. The system includes a personal computer (PC) having hardware and software for receiving an electronic coupon from the system of computer networks, translating the received coupon into a binary format, and sending the binary-formatted coupon to a card-writing device. The card-writing device writes the coupon data onto a portable customer card ("smart card") approximately the size of a credit card. Subsequently, the customer goes to the store with the card. Upon completion of shopping, the customer redeems the electronic coupons at the checkout area, by inserting the card into the checkout station. During checkout, the customer is credited with the value of a coupon when UPC data from a bar code reader corresponds to a coupon stored on the card.

94 Claims, 21 Drawing Sheets

U.S. PATENT DOCUMENTS

| | | | |
|---|---|---|---|
| 5,500,681 A | | 3/1996 | Jones |
| 5,519,704 A | | 5/1996 | Farinacci et al. |
| 5,594,493 A | | 1/1997 | Nemirofsky et al. |
| 5,708,782 A | | 1/1998 | Larson et al. |
| 5,710,886 A | | 1/1998 | Christensen et al. |
| 5,710,887 A | | 1/1998 | Chelliah et al. |
| 5,789,732 A | | 8/1998 | McMahon et al. |
| 5,799,157 A | | 8/1998 | Escallon |
| 5,802,278 A | | 9/1998 | Isfeld et al. |
| 5,802,320 A | | 9/1998 | Baehr et al. |
| 5,855,007 A | | 12/1998 | Jovicic et al. |
| 5,884,277 A | | 3/1999 | Khosla |
| 5,970,469 A | | 10/1999 | Scroggie et al. |
| 6,067,526 A | * | 5/2000 | Powell .......................... 705/14 |
| 6,237,145 B1 | | 5/2001 | Narasimhan et al. |
| 6,336,098 B1 | * | 1/2002 | Fortenberry et al. .......... 705/14 |
| 6,450,407 B1 | * | 9/2002 | Freeman et al. .............. 705/14 |

OTHER PUBLICATIONS

"Warner Bros. Online opens entertainment multiplex on the World Wide Web," Business Wire, Jan. 17, 1996.

"Pouring cash into the Internet," Wilder, Clinton, Information Week, No. 560, Jan. 1, 1996.

"ON Technology launches first World Wide Web catalog focusing exclusively on tools for Novell networks," PR Newsire, Aug. 11, 1995.

"North American CAD opens Internet storefront," Newsbytes News Network, Mar. 3, 1995.

"Sony launches web online offering," Newsbytes News Network, Feb. 16, 1995.

"Carriers set their sights on managed services for carriers to strike outsourcing gold, net managers will have to buy what they're Betting," Robin Gareiss, Data Communications, vol. 23, No. 17, Nov. 21, 1994.

"Ready for the online bookstore?, " Publisher's Weekly, vol. 241, No. 38, Sep. 19, 1994.

MMAC's Viewpoint Systems enters agreement with Boca Research, Multimedia Networking Newsletter, Multimedia Networking Newsletter, vol. 3, No. 12, Jan. 15, 1996.

Merging Technologies For Companies to Alter Strategy, Data Channels, vol. 22, Issue: 24, Nov. 20, 1995.

New technologies bring new tools, new rules. (HR Systems), Sandra E. O'Connell, HRMagazine, vol. 40, No. 12 ISSN: 1047-3149, Dec. 1, 1995.

Digital Adds Team Collaboration to the Internet, Law Technology Product News, vol. 2, No. 12, Dec. 1995.

QCI/Recall. (Centerline Software's debugging/testing software)(Brief Article)(Product Announcement), Jan. 24, 1996.

Videoconferencing: White Pine Software releases enhanced cu–seeme for purchase over the Internet!; White Pine Launches a New Era of Desktop Videoconferencing, Feb. 19, 1996.

Oracle Suite to Link Internet, Databases, Ken Yamada, Computer Reseller News, No. 658, Nov. 13, 1995.

Modem challenge. (cable television), Communications Int'l, Summer Lopez, vol. 23, No. 2, ISSN 0305-2109, Feb 1, 1996.

Lancity to show low–cost cable modem at NCTA, Laring Wirbel, Electronic Engineering Times, Issue: 846, May 1, 1995.

New's Service puts FSN to test. (Time Warner Ine's Full Service Network) (includes related article), David J. Wallace, America's Network, vol. 99, No. 7, Apr. 1, 1995.

Internet pioneer eyes cable. IPaul Baron), Leslie Ellis, Multichannel News, vol. 16, No. 6, ISSN: 0276–8593 Feb. 6, 1995.

A peak behind the curtain, (Time Warner Cahle's Full Service Network), Paula Bernier, Telephony, No. 1, ISSN: 0040–2656, Jan. 2, 1995.

Defendants Visa U.S.A. Inc.'s and Target Corporation's Memorandum of Law in Opposition to Plaintiff Softcard Systems, Inc.'s Motion for preliminary Injunction, filed with clerk's office Aug. 5, 2004.

Defendants Visa U.S.A. Inc.'s and Target Corporation's Invalidity Contentions, filed with clerk's office Sep. 2, 2004.

Appendix 1 to Defendants' Invalidity Conventions (U.S. Pat. No. 6,012,038), filed with clerk's office Sep. 2, 2004.

Appendix III to Defendants' Invalidity Contentions (U.S. Pat. No. 6,607,526), filed with clerk's office Sep. 2, 2005.

"Catalink Direct's Online PC Catalog' adds web service," Newsbytes News Network, Apr. 7, 1995.

"Spinning a better web. (Internet computer network)," Tehnology Review, Massachusetts Institute of Technology Alumni Association, vol. 98, No. 3, Apr. 1, 1995.

"Web–Server challenge management roles get complicated as servers proliferate," R. Scott Raynovich, LAN Times, vol. 13, No. 2, Jan. 22, 1996.

Digital Building a sense of community on the Net, Frentzen, Jeff, PC Week, vol. 12, No. 48, Dec. 4, 1995.

Hardware: Plug and play security solution, dot.COM, vol. 2, No./10, Jan. 1, 1996.

Hat IPO Pace is expected to resume, Molly Baker, The Wall Street Journal, Jan. 2, 1996.

Tools help iron out security wrinkles, Corner, Louis, No. 592, Jan. 15, 1996.

Channel surfing. (Interoperability supplement)(interactive television)(includes related articles on video server storagr and broadcast television)(Technology Information), Anita Karve, LAN Magazine, vol. 10, No. 12, ISSN:1069–5621, Nov. 1, 1995.

Channel surfing, (Interoperability supplement)(interactive television) (includes related articles an video server storage and broadcast television) (Technology Information), Anita Karve, Network VAR, vol. 3, No. f D, ISSN:1082–8818, Oct. 1, 1995.

Cable TV joins LANs to the Internet ; the school/cable connection. (the Lexington, MA, Public School District uses LANcity's muter technology to link its NetWare and Apple-Talk Ethenet LANs over existing cable TC lines)(Brief Article), LAN Magazine, vol. 9, No. 12, ISSN: 1069–5621, Nov. 1, 1994.

Advisory Committee creates new NII group, offers interoperability report, HDTV Report Phillips Business Information, Inc., vol. 4, No. 6 ISSN: 1055–9280, Mar. 14, 1994.

U.S. Appl. No. 60/466,270. filed Jun. 6, 1995, Narasimhan et at.

"Catalink Direct's 'Online PC Catalog' adds web service," Newsbytes News Network, Apr. 7, 1995.

"Spinning a better web. (Internet computer network), " Technology Review, Massachusetts Institute of Technology Alumni Association, vol. 98, No. 3, Apr. 1, 1995.

"Web–Server challenge management roles get complicated as servers proliferate," R. Scott Raynovich, LAN Times, vol. 13, No. 2, Jan. 22, 1996.

Building a sense of community on the Net, Frentzen, Jeff, PC Week, vol. 12, No. 48, Dec. 4, 1995.

Channel surfing, Anita Karve, Network VAR, vol. 3, No. 10, ISSN: 1082–8818, Oct. 1, 1995.

* cited by examiner

To: bsmith@aol.com
From: couponhouse@usretail.COM
Date: December 17, 1992 9:20AM Enclosed is a coupon for one package of Old World Pasta. Please print this EMAIL message to your customer card writing device (device SCW:).

Coupon: 49u4059uvcn v075802GYQ-H-2G WNO87V5 HJ-6AG0ksh83459: sdlkfjs0r9838407785e5409mgvop85 p3cdsl7envx.'

| | | | |
|---|---|---|---|
| 30: | 7170312350 | 30: | 7170312350 |
| | 1 | | 1 |
| | 200 | | 200 |
| | 7170312780 | | 7170312780 |
| | 1 | | 1 |
| | 50 | | 50 |
| | | | 7170312682 |
| | | | 1 |
| | | | 150 |

SYSTEM AND METHOD FOR DISTRIBUTING COUPONS THROUGH A SYSTEM OF COMPUTER NETWORKS

This Application is a Continuation of copending application Ser. No. 09/245,419 of KEN R. POWELL filed Feb. 5, 1999, now U.S. Pat. No. 6,067,526 for SYSTEM AND METHOD FOR DISTRIBUTING COUPONS THROUGH A SYSTEM OF COMPUTER NETWORKS, the contents of which is hereby incorporated by reference, which is a Continuation of application Ser. No. 09/100,868 of KEN R. POWELL filed Jun. 22, 1998 for SYSTEM AND METHOD FOR CONTROLLING DISTRIBUTION OF COUPONS, now U.S. Pat. No. 6,012,038 the contents of which is hereby incorporated by reference, which is a Continuation of application Ser. No. 08/603,482 of KEN R. POWELL filed Feb. 20, 1996 for SYSTEM AND METHOD FOR DISTRIBUTING COUPONS THROUGH A SYSTEM OF COMPUTER NETWORKS, now U.S. Pat. No. 5,806,044 the contents of which are hereby incorporated by reference.

BACKGROUND OF THE INVENTION

1. Field of the Invention

This invention relates generally to a retail system and, more particularly, to a system and method for distributing discount coupons through a system of computer networks.

2. Description of Related Art

Discount coupons are a popular means to stimulate sales of products such as grocery store items. In 1992, approximately 310 billion coupons were distributed and 7.7 billion coupons were redeemed, saving customers $4 billion. It has been estimated that in-store couponing coupled with advertising increases sales by 544%.

A typical marketing scheme involves placing coupons in a newspaper, by printing the coupons in the newspaper or by inserting coupon inserts into the newspaper, and allowing customers to bring the printed coupons to a store for redemption. One problem with this scheme is that the redemption rate is typically only a few percent of the coupons printed, the unredeemed coupons representing an overhead associated with this scheme. To alleviate this overhead, another marketing scheme involves distributing the coupons in the store, thereby avoiding the cost of printing coupons in a newspaper, and capitalizing on the fact that 66% of buyer decisions are made at the time of product purchase. Both the in-store scheme and the newspaper scheme, however, are susceptible to fraud by an unscrupulous retailer that requests reimbursement payments by presenting unredeemed coupons to the clearing house. Other schemes include delivering coupons to customers through the mail, distributing coupons in or on the product package, and distributing coupons at checkout. All of these schemes have an overhead cost of handling the coupons and of sending the redeemed coupons to a clearing house to enable product manufacturers to reimburse retailers for the reduction in proceeds resulting from coupon redemptions.

SUMMARY OF THE INVENTION

According to an aspect of the present invention, a processing system comprises a first computer, the processing system being for a second system including second computer, a plurality of portable cards transported by consumers, each card containing an electronic memory, a plurality of homes, a store and a routing system for receiving a signal and generating network addresses in response to an inter-network address in the received signal, the routing system including a plurality of wide area communication links, wherein the first computer includes circuitry for sending first signals to the routing system, each first signal including a signal corresponding to a product, and an inter-network address corresponding to the second computer, to cause the routing system to generate a plurality of network addresses, each of the plurality of network addresses corresponding to a respective computer in a respective computer network, and wherein the second computer includes circuitry for receiving first signals. The second system further includes a plurality first processors, each located in one of the plurality of homes, responsive to a signal corresponding to a product received by the second computer, for sending a memory signal to a portable card in the plurality of cards, the memory signal corresponding to the product; and a second processor, in the store, for receiving the memory signal from a portable card in the plurality of cards, to send a telecommunications signal out of the store via a telecommunications signal path.

According to another aspect of the present invention, there is a method in a system including a store, a plurality of portable cards each containing an electronic memory, a plurality of homes and a routing system for receiving a signal and generating a routing signal in response to an inter-network address in the received signal, the routing system including a plurality of wide area communication links. The method comprises sending first signals from a first computer to the routing system, each first signal including a signal corresponding to a product, and an inter-network address corresponding to a second computer, to cause the routing system to generate a plurality of routing signals, each of the plurality of routing signals corresponding to a respective portion of a signal path between the first and second computers; receiving a signal corresponding to a product, sent in the previous step, and the step, performed in one of the homes, of sending, responsive to the signal received in the previous step, a memory signal to a portable card in the plurality of cards, the memory signal corresponding to the product, and the step of subsequently, moving the portable card to the store, and the step, performed in the store, of receiving the memory signal from the portable card, to send a telecommunications signal out of the store via a telecommunications signal path.

According to yet another aspect of the present invention, there is a processing system for a second system including a first computer, a second computer, a plurality of portable cards each containing an electronic memory, a plurality of homes, a store with a first receiver that receives signals from the plurality of portable cards to send a telecommunications signal out of the store via a telecommunications signal path, and a routing system for receiving a signal and generating a routing signal in response to an inter-network address in the received signal, the routing system including a plurality of wide area communication links. The processing system comprises circuitry, in the first computer, that sends first signals to the routing system, each first signal including a signal corresponding to a product, and an inter-network address corresponding to the second computer, to cause the routing system to generate a plurality of routing signals, each of the plurality of routing signals corresponding to a respective portion of a signal path between the first and second computers, thereby enabling the second computer to receive first signals, wherein the second system further includes a plurality of home computers, each located in one of the plurality of homes, responsive to a signal corresponding to a product, from a first signal received by the second computer, for sending a memory signal to a portable card in the plurality of cards, the memory signal corresponding to the product.

According to yet another aspect of the present invention, there is a method in a system including a store, a plurality of portable cards each containing an electronic memory, a plurality of homes and a routing system for receiving a signal and generating a routing signal in response to an inter-network address in the received signal, the routing system including a plurality of wide area communication links. The method comprises sending, from a first computer, a first signal to the routing system, the first signal including a signal corresponding to a product, and an inter-network address corresponding to a second computer, to cause the routing system to generate a plurality of routing signals, each of the plurality of routing signals corresponding to a respective portion of a signal path between the first and second computers, thereby enabling the second computer to receive the first signal; and the step, performed in one of the homes, of sending, responsive to the signal corresponding to a product received by the second computer, a memory signal to a portable card in the plurality of cards, the memory signal corresponding to the product, and the step of subsequently, moving the portable card to the store, and the step, performed in the store, of receiving the memory signal from the portable card, to send a telecommunications signal out of the store via a telecommunications signal path.

BRIEF DESCRIPTION OF THE DRAWINGS

FIG. 5 is the display of the personal computer showing an electronic coupon received through the system of computer networks into home 160.

FIGS. 15A and 15B are diagrams of some memory contents of a customer card at different points in time.

The accompanying drawings which are incorporated in and which constitute a part of this specification, illustrate embodiments of the invention and, together with the description, explain the principles of the invention, and additional advantages thereof. Throughout the drawings, corresponding parts are labeled with corresponding reference numbers.

DESCRIPTION OF THE PREFERRED EMBODIMENTS

Figure 1A:
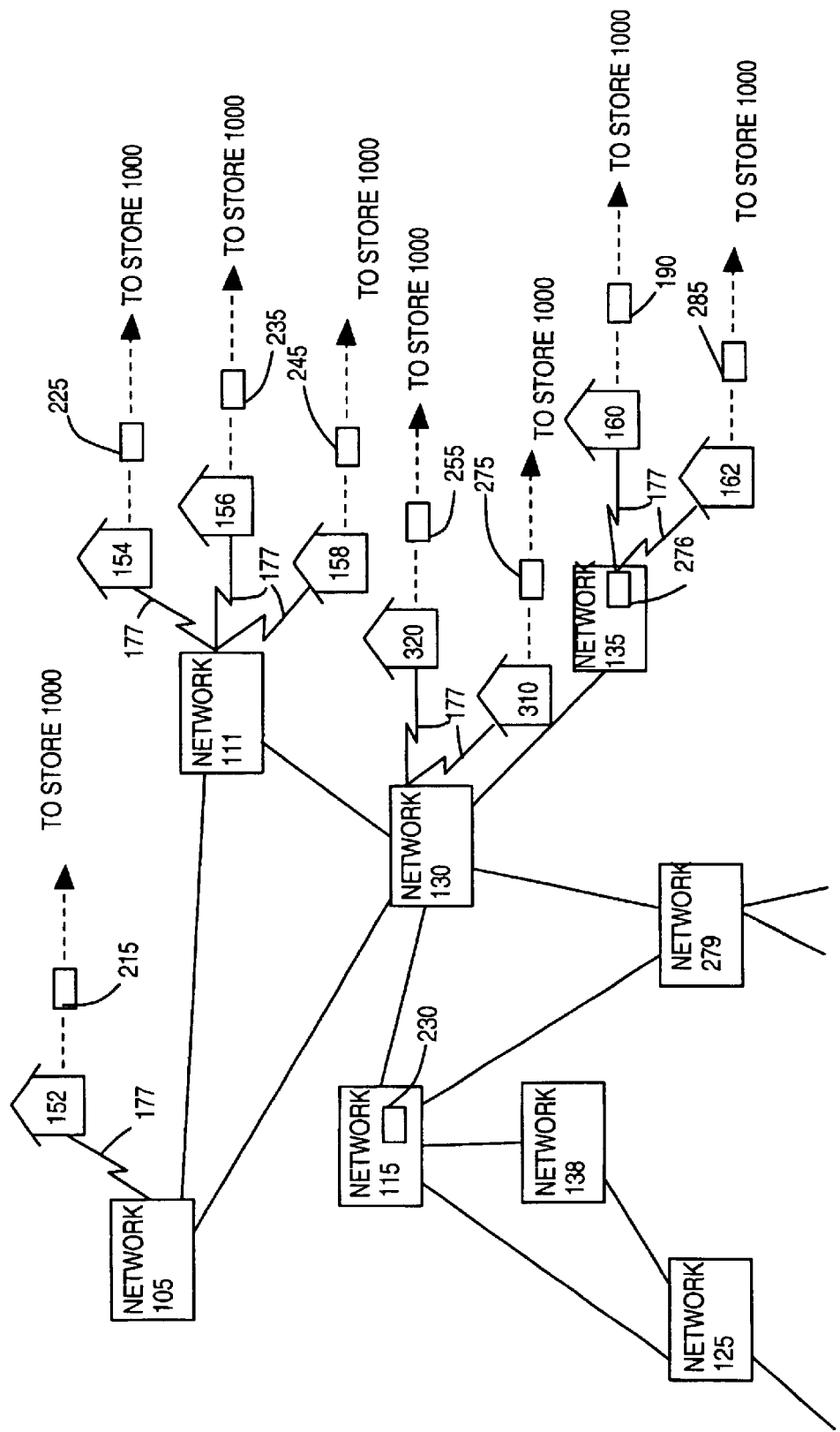
FIGS. 1A and 1B are a schematic diagram of a system of computer networks, in accordance with a first preferred embodiment of the present invention.
Figure 1B:
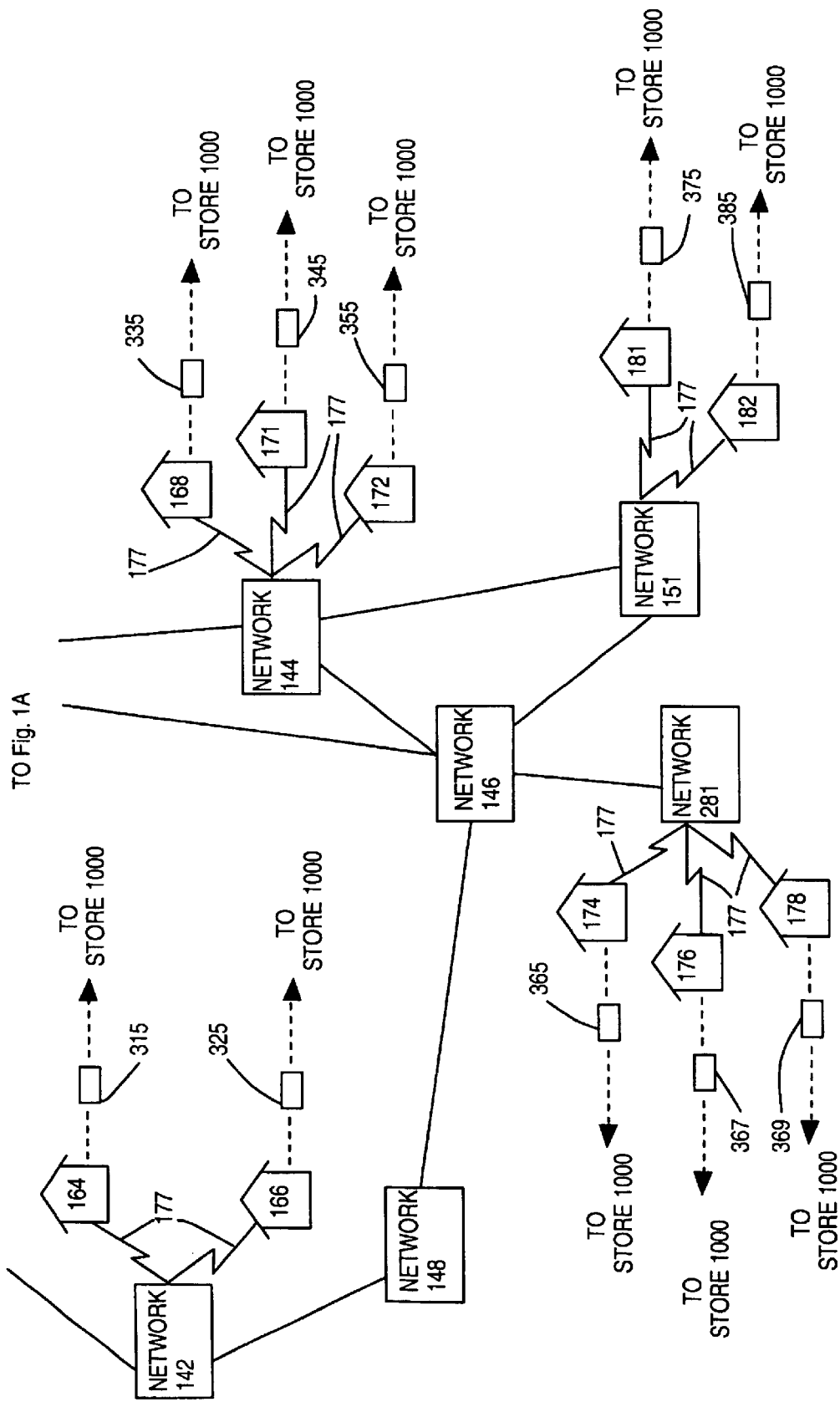

FIGS. 1A and 1B show a system of computer networks for distributing coupons in accordance with a first preferred embodiment of the present invention. Computer networks 105, 111, 115, 130, 135, 138, 125, 279, 142, 148, 144, 146, 281, and 151 are interconnected. Each computer network includes a plurality of computers. Each of homes 152, 154, 156, 158, 160, 162, 164, 166, 168, 171, 172, 174, 176, 178, 181, 182, 310, and 320 is coupled to one of the computers networks via a respective telephone signal path 177.

The system includes portable customer cards 215, 225, 235, 245, 255, 275, 285, 190, 315, 325, 335, 345, 355, 365, 367, 369, 375, and 385. Each customer card is a portable customer card, approximately the size of a credit card. Each card contains a random access memory for storing electronic coupons.

A computer 230 within network 115 stores electronic coupons and distributes the stored coupons to the homes. As represented schematically in FIGS. 1A and 1B, a customer carries her respective card from her home to a store. A computer in each home receives a coupon from computer 230, via one or more of the computer networks, and stores the received coupon onto one of the cards. For example, a computer in home 160 receives a coupon signal from computer 230 via networks 115, 130, and 135 and stores the received coupon onto card 190.

Figure 2:
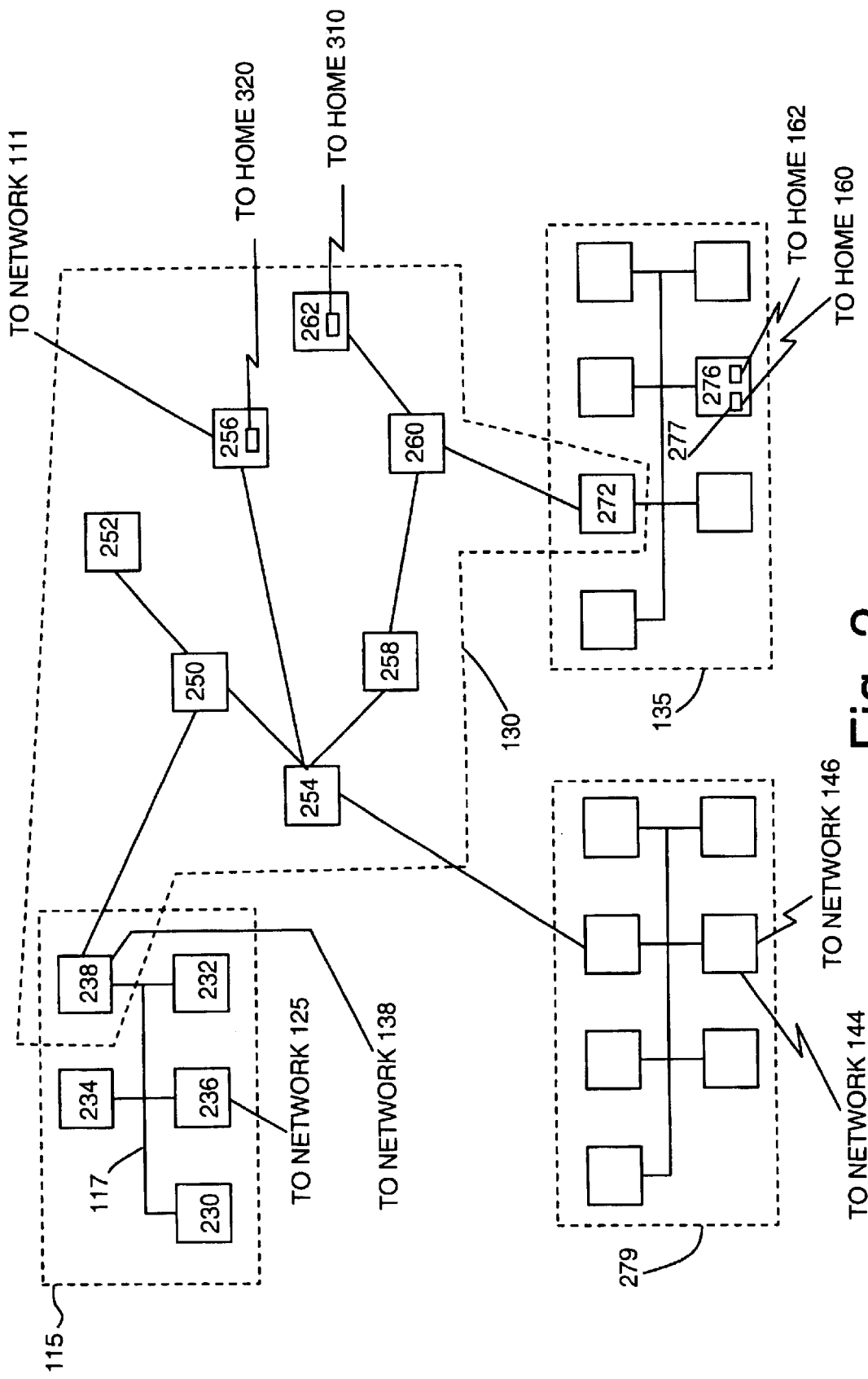
FIG. 2 is a diagram emphasizing a part of the system shown in FIGS. 1A and 1B.

FIG. 2 shows a section of the preferred system, emphasizing a path between computer 230 and home 160. Network 115 is a local area network (LAN), network 130 is a wide area network (WAN), network 135 is an LAN, and network 279 in a LAN.

Network 115 includes a plurality of first computers, computers 234, 238, 230, 236, and 232. Each of these first computers has a respective network address uniquely identifying the computer on network 115. The first computers can communicate with each other by sending data packets in a certain format. Each network-115-packet has a field containing the destination address of the packet. Each network-115-packet is in a format conforming to the communication protocol of network 115, meaning, for example, that the packet has a destination address field offset a certain number of bits from the start of the packet, and that the destination address field has a certain number of bits. Computer 230 includes circuitry (hardware and software) for sending a data packet through transmission cable 117. The circuitry includes software for constructing a packet, having the packet format of network 115, containing a discount coupon identifying a product.

Network 130 includes a second plurality of computers, computers 254, 250, 252, 258, 256, 262, 260, and 272.

Computer 230 sends this product-identification signal to home 160 via computer 238, as described in more detail below. Each of these second computers has a respective second network address uniquely identifying the computer on network 130. The second computers communicate with each other by sending a packet in the format for network 130.

The data packet from computer 230 includes a destination address field allowing computer 238 to recognize that the data packet is to be received by computer 238. Computer 238 has an address on both LAN 115 and WAN 130, meaning that computer 238 has circuitry for recognizing an its own address in a network-115-formatted packet sent over network 115, and has circuitry for recognizing an its own address in a network-130-formatted packet sent over network 130. Thus, computer 238 acts to route packets between networks 115 and 130. In other words, computer 238 includes circuitry, responsive to an address on network 115, for receiving a packet in the format of network 115, containing an electronic coupon identifying a certain product, and for sending a second packet in the format of network 130, the second packet containing a signal identifying the certain product. When computer 238 receives a packet destined for computer 276, computer 238 constructs a packet addressed to computer 272, using the protocol for network 130.

Computer 272 has an address on both WAN 130 and LAN 135 and, therefore, computer 272 acts to route packets between networks 130 and 135. When computer 272 receives the packet, computer 272 constructs a packet addressed to computer 276, using the protocol of network 135.

More specifically, computer 230 constructs an "IP" packet addressed to computer 276, using the Internet Protocol (IP). Computer 230 then imbeds this IP packet within a network-115-formatted packet addressed to computer 238, using the protocol of network 115. When computer 238 receives the packet, computer 238 reads the IP address, determines that the IP packet should be sent over network 130, and imbeds the IP packet within an network-130-formatted packet addressed to computer 272, using the protocol of network 130.

When computer 272 receives the packet, computer 272 reads the IP address, determines that the IP address corresponds to computer 276, and imbeds the IP packet in a packet addressed to computer 276, using the protocol of network 135.

Figure 3A:
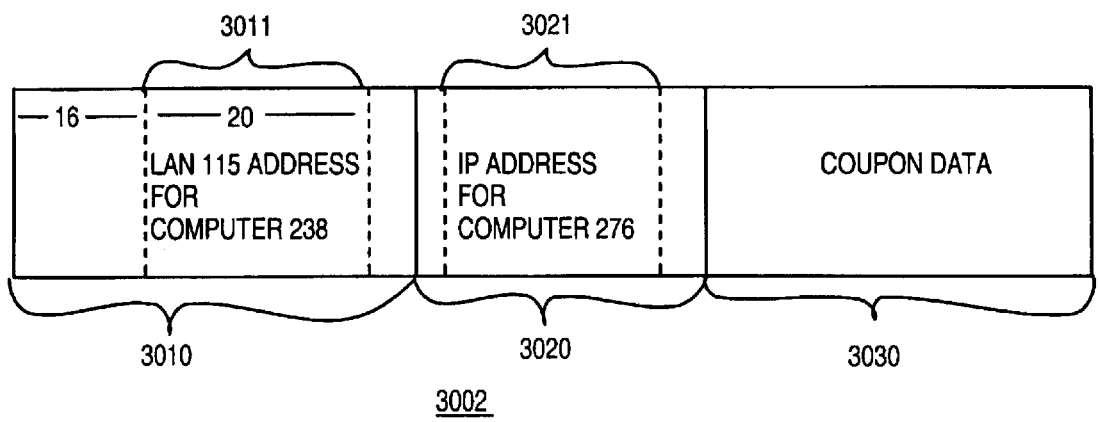
FIGS. 3A, 3B, and 3C are diagrams showing a discount coupon sent through a system of computer networks from computer 230 to Home 160.

FIG. 3A shows data packet 3002 in the format of network 115, sent by computer 230 through cable 117. Header field 3010 includes a 20 bit destination address field 3011 identifying computer 238 on network 115. Destination address field 3011 is 16-bits removed from the beginning of the data package 3002. Header 3010 contains other fields, including a 20-bit field containing the address of the sender of packet 3002, and a field containing data correction bits. Field 3020 includes an Internet Protocol (IP) address field 3021 identifying computer 276. Field 3030 includes electronic coupon information in ASCII (American Standard Code for Information Interchange) text form.

Figure 3B:
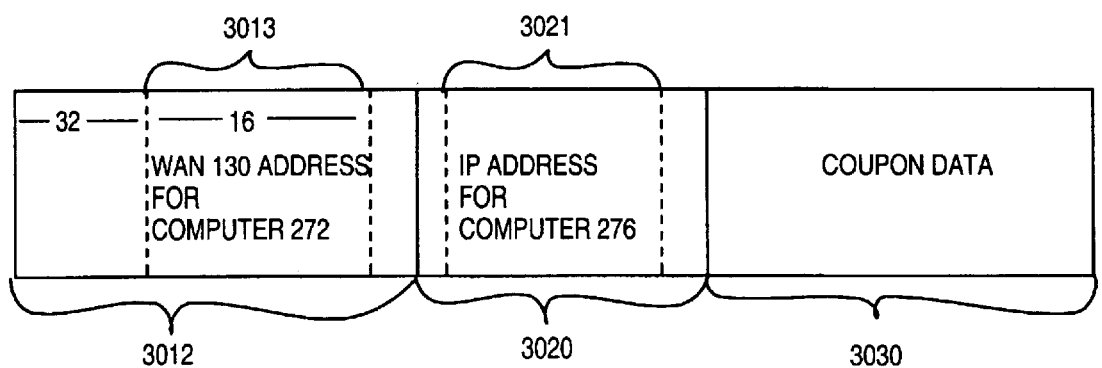

Computer 238, which resides on both LAN 115 and WAN 130, includes circuitry to translate packet 3002 received from computer 230, into packet 3004 shown in FIG. 3B. Packet 3004 includes header field 3012. Header 3012 includes a 16 bit destination address field 3013 identifying computer 272 on WAN 130. Address field 3013 is 32-bits removed from the start of packet 3004. Header 3012 has other fields, including a field identifying the sender of packet 3004, and a field containing data correction bits.

Computer 238 determines that the packet should be sent to computer 272 on network 130 by reading a routing table. The routing table has an entry for network 135. The entry for network 135 identifies network 130 and computer 272 as the path to be used when computer 238 is sending a packet to a computer on network 135. Thus, computer 238 constructs packet 3004 in response to IP address field 3021 in packet 3002.

As shown in FIG. 2, computer 238 sends a packet to computer 272, via computers 250, 254, 258, and 260.

In other words, each packet is essentially a type of signal having a network address of a certain length and having a certain number of digits. A signal on one network may include a first network address O1 digits removed from the start of the signal. A signal another network may include a second network address is O2 digits removed from the start of the signal, wherein O1 is not equal to O2, and the first network address includes N1 digits and the second network includes N2 digits, wherein N1 is not equal to N2.

Figure 3C:
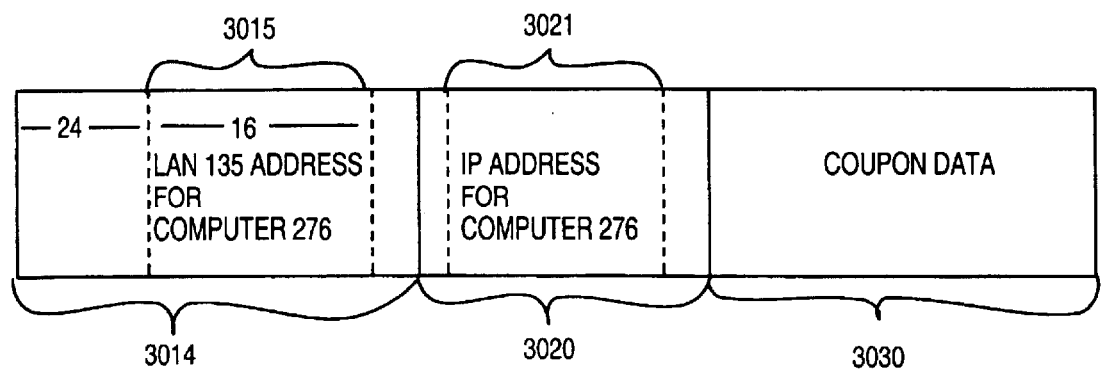

Computer 272, which resides on both WAN 130 and LAN 135, includes circuitry to translate packet 3004 received from computer 238, into packet 3006 shown in FIG. 3C. Packet 3006 includes header field 3014. Header 3014 includes an address field 3015 identifying computer 276 on LAN 135. Header 3014 includes a 16 bit destination address field 3015 identifying computer 276 on LAN 135. Address field 3015 is 24-bits removed from the start of packet 3006. Header 3014 has other fields, including a field identifying the sender of packet 3006, and a field containing data correction bits.

Thus, the preferred system may be conceptualized as computers sending packets containing electronic coupons. The preferred system may also be conceptualized as programs, running on the computers, that send electronic mail (Email) messages to each other. Each Email message includes one or more of the packets described above. The programs include a coupon server (not shown), running on computer 230, for constructing the Email message and sending the Email message to a customer, and Mail Transfer Agents and a User Agent (not shown) that route the Email messages between each other and ultimately store an Email message into an electronic mail box for the recipient of the message. An electronic mailbox is a memory area readable by the owner of the mail box. For example, FIG. 2 shows mail box 277 readable by personal computer 400 in home 160.

Figure 4:
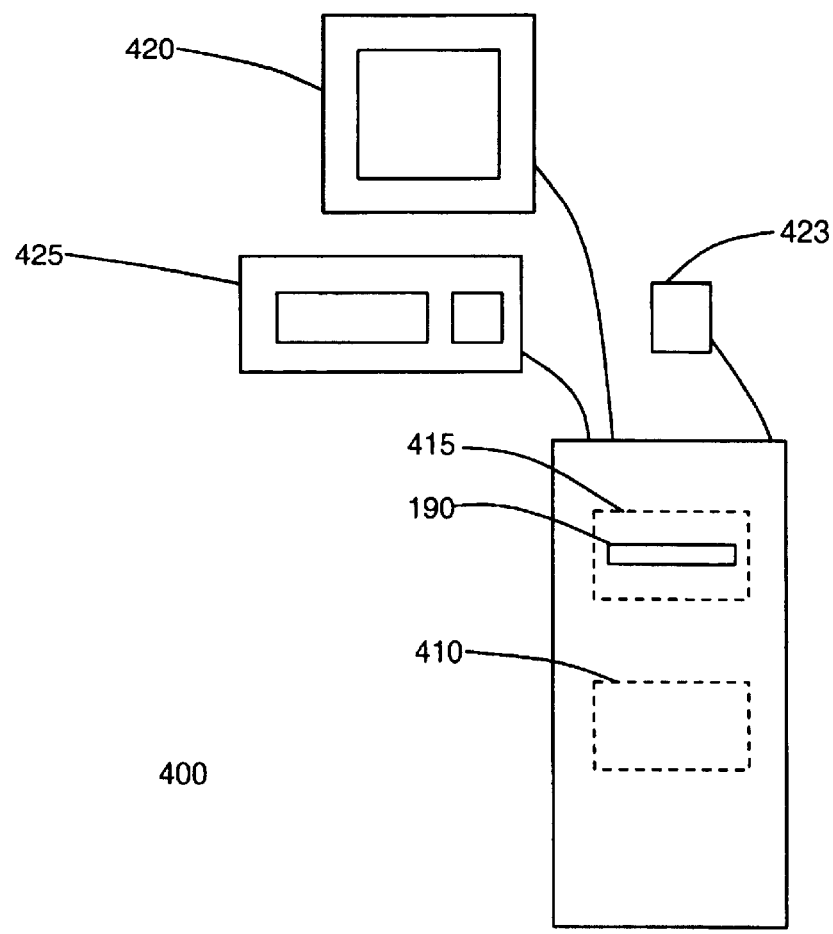
FIG. 4 is a diagram of a personal computer inside Home 160.

FIG. 4 shows a personal computer 400 within home 160. Computer 400 includes a modem 410, a CRT display 420, a keyboard 425, a mouse 423, and a coupon-writing device 415. To receive an electronic coupon, the user establishes a telephone connection between computer 400 and computer 276 through modem 410. Subsequently, the user logs onto computer 276 and invokes a program to read Email stored in mailbox 277.

FIG. 5 shows CRT display 420 after the mail-reading program reads a coupon message from mailbox 277. As shown in FIG. 5, coupon data 3030 includes the ASCII text of an electronic mail (Email) message. Message field 5010 identifies the sender and receiver of the message, "couponhouse@usretail.com" being the Email address of the coupon server on node 230 and "bsmith@aol.com" being the Email address of the customer residing in home 160. Message field 5015 is user readable text identifying the coupon. Message field 5020 is electronic coupon information encoded in text format. The user sends coupon data 3030 to device 415 by issuing a print command and specifying device "SCW:", which is a name designating card-writing device 415. A driver program for device 415 receives the text data and translates the data into a certain binary format, described below, and sends the binary data to device 415. Device 415 couples to a customer card 190 and sends data to card 190.

Figure 6:
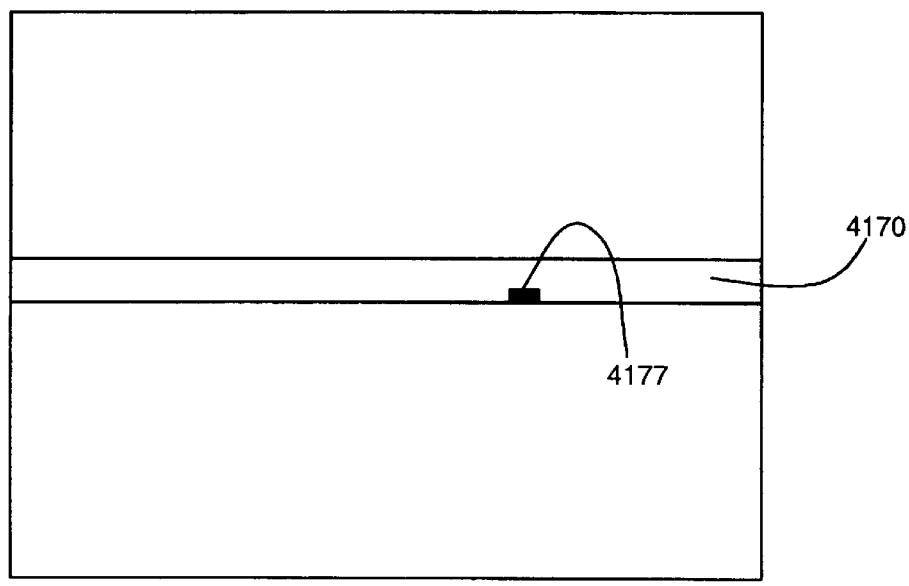
FIG. 6 is a side view of the card-writing device in the personal computer for writing coupons onto portable cards in home 160.

FIG. 6 shows a side view of card-writing device 415, including interface slot 4170. Interface slot 4170 has a width sufficient to accommodate the width of one of the customer cards 190. When a card 190 is in interface slot 4170, conductive contact 4177 inside interface slot 4170 touches contact 2427 (described below) on the customer card. Interface slot 4170 has other contacts (not shown) for touching the other card contacts 2420 (described below).

Figure 7A:
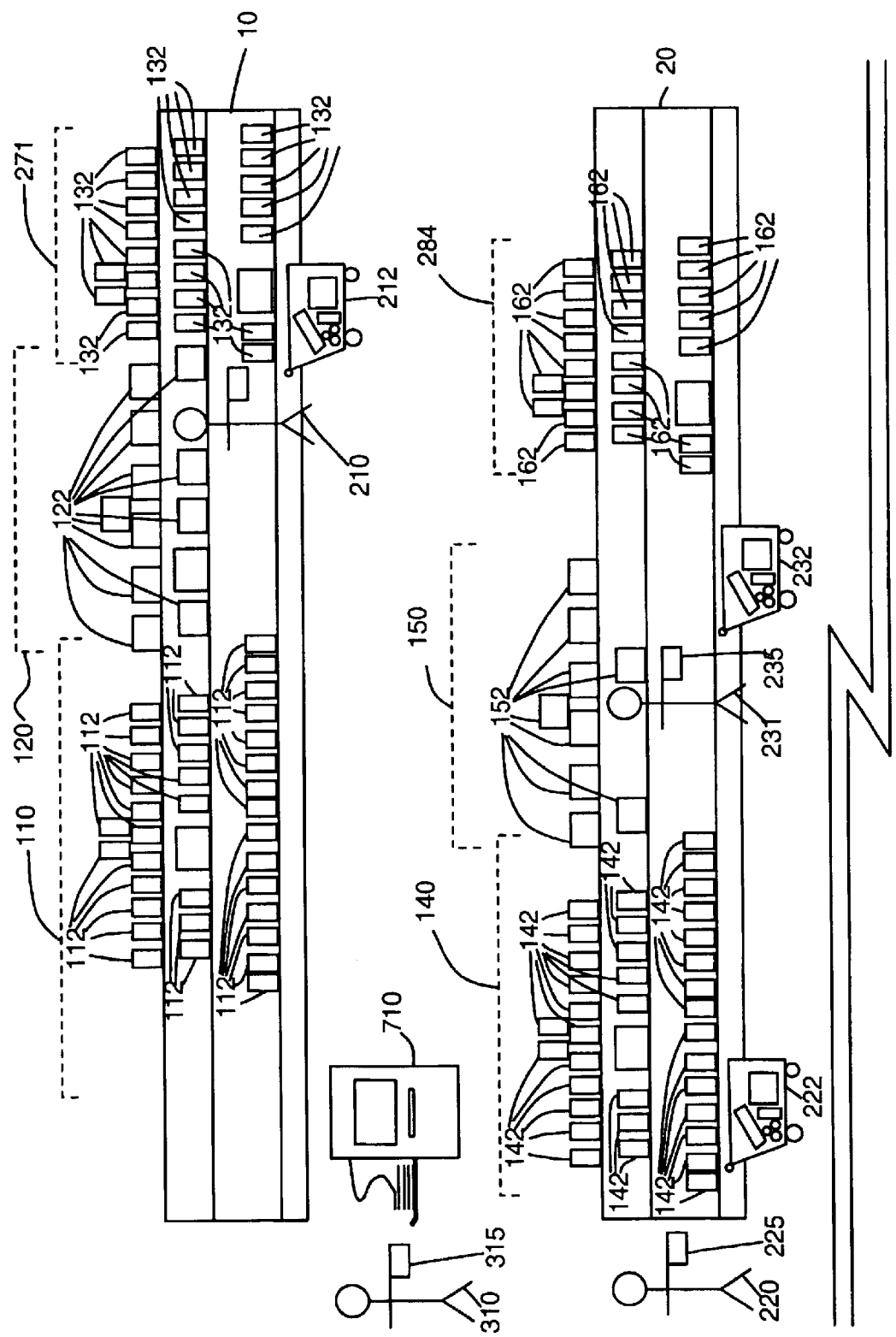
FIGS. 7A and 7B are a schematic diagram of a retail store in the preferred system.
Figure 7B:
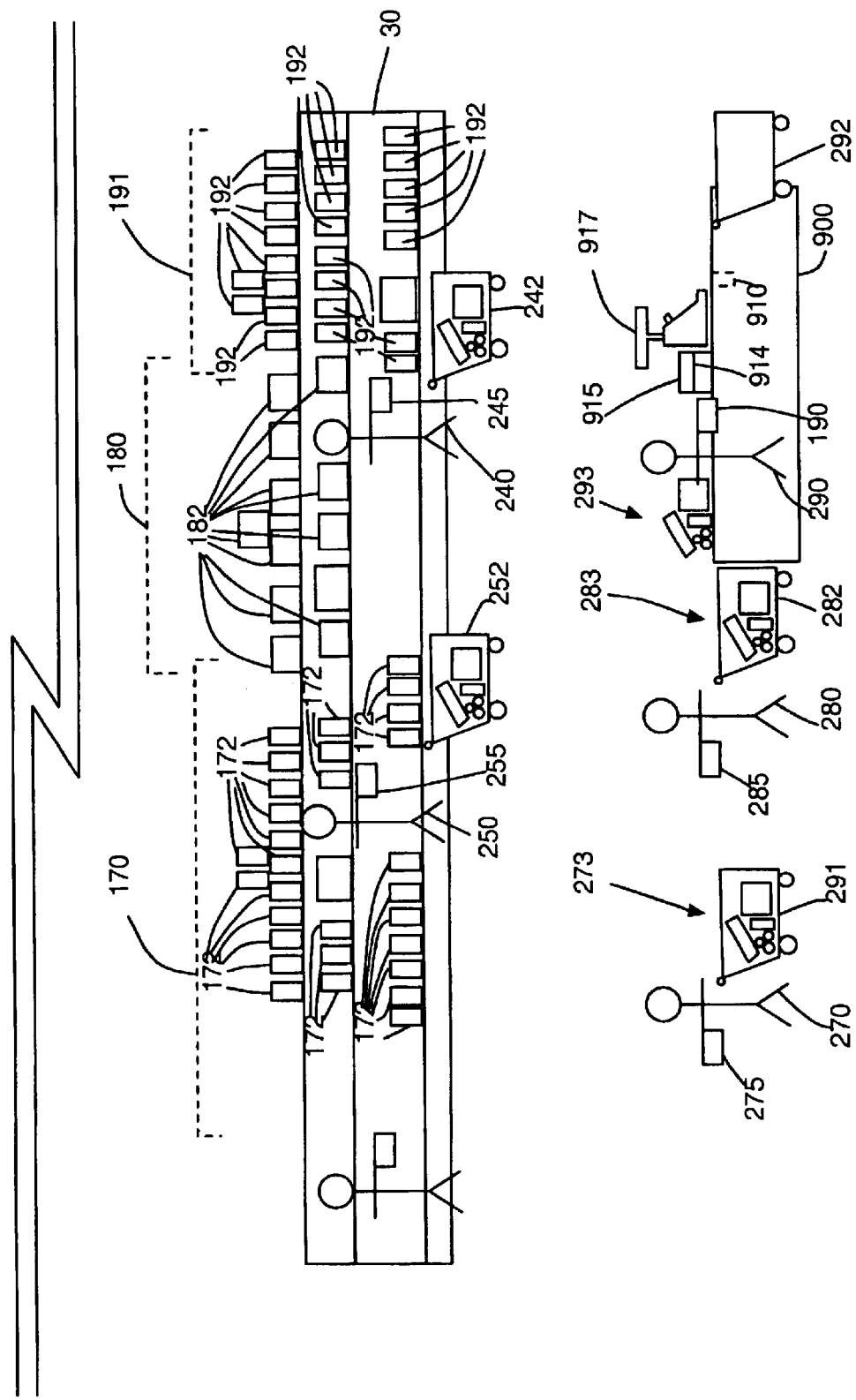

FIGS. 7A and 7B show grocery store 1000. FIG. 7A and FIG. 7B are each a partial view of store 1000. Customers 210, 220, 231, 240, 250, 270, 280, and 290, shop in the store. Before shopping in the store, each of these customers obtained a customer card. For example, customer 231 obtained customer card 235 from a bank, by completing an application for the bank. The application contained questions to collect demographic data, including birth date, income level, past buying patterns, geographic location, size of family, level of education, and job-related data. The bank subsequently wrote customer identification data for customer 231 onto customer card 235, and issued customer card 235 to customer 231, and sent the customer's demographic data to a clearinghouse which then stored the demographic data on disk. Each of customers 210, 220, 240, 250, 270, 280, and 290 obtains a respective customer card in a similar manner. In other words, for each customer the preferred method writes demographic data for the customer onto a disk in the market research center, and writes personal identification data for the customer onto a respective card for the customer.

After redemption data, including customer identification data from a plurality of cards, is compiled and sent to a market research center, as described below, the customer identification data is used to access the corresponding demographic data, thereby providing the manufacturer with valuable marketing data on coupon program effectiveness and customer demographics.

Store 1000 includes shelves 10, 20, and 30, defining aisles between the shelves. The supermarket has a plurality of product areas, each corresponding to a respective product. Product Area 110 has Acme brand ammonia. Product Area 120 has Old World brand pasta. Product Area 271 has Lighthouse brand light bulbs.

More specifically, Product Area 110 has bottles of ammonia 112 grouped together on multiple shelves. Bottles of ammonia 112 are contiguously grouped, meaning that no other product is between any two bottles of ammonia 112.

Figure 8A:
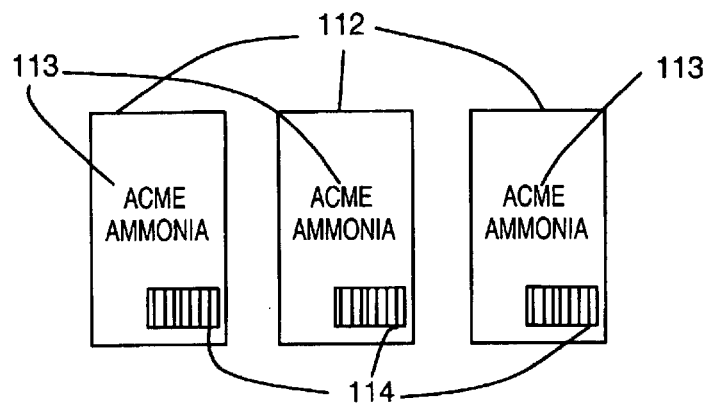
FIGS. 8A, 8B, and 8C are enlarged views of some products shown in FIGS. 7A and 7B.

FIG. 8A shows an enlarged view of some of the bottles of ammonia 112. Each bottle of ammonia has a common Universal Product Code (UPC) label 114, which is a group of parallel lines that encodes a number that uniquely identifies acme ammonia. In other words, label 114 is different than labels of units of other products. Each bottle of ammonia 112 also has a common character label 113. Character label 113 is "ACME AMMONIA." Label 113 is different than labels of units of other products.

Product Area 120 has boxes of pasta 122 grouped together on multiple shelves. Boxes of pasta 122 are contiguously grouped, meaning that no other product is between any two boxes of pasta 122.

Figure 8B:
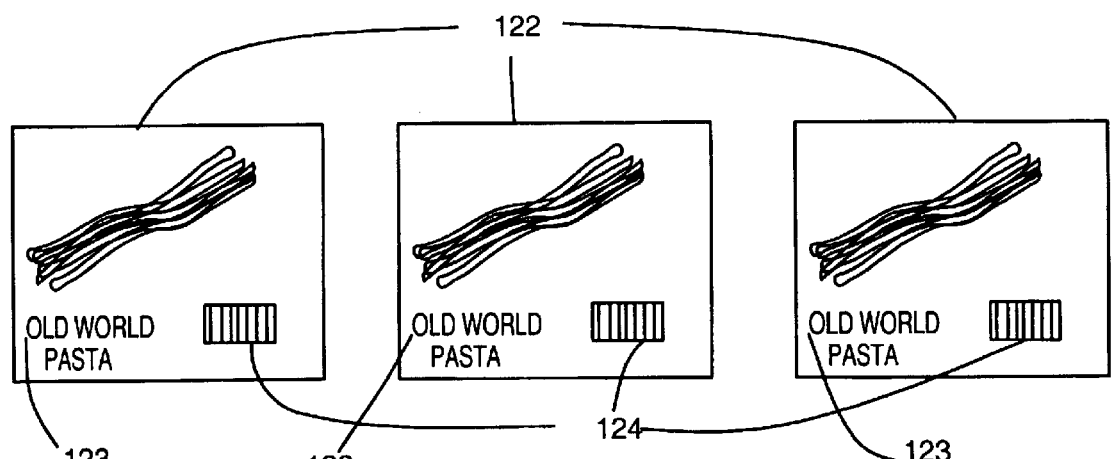

FIG. 8B shows an enlarged view of some of the boxes of pasta 122. Each box of pasta 122 has a common Universal Product Code (UPC) label 124, which is a group of parallel lines that encodes a number that uniquely identifies Old World pasta. In other words, label 124 is different than labels of units of other products. Each box of pasta 122 also has a common character label 123. Character label 123 is "OLD WORLD PASTA." Label 123 is different than labels of units of other products.

Product Area 271 has boxes of light bulbs 132 grouped together on multiple shelves. Boxes of light bulbs 132 are contiguously grouped, meaning that no other product is between two boxes of light bulbs 132.

Figure 8C:
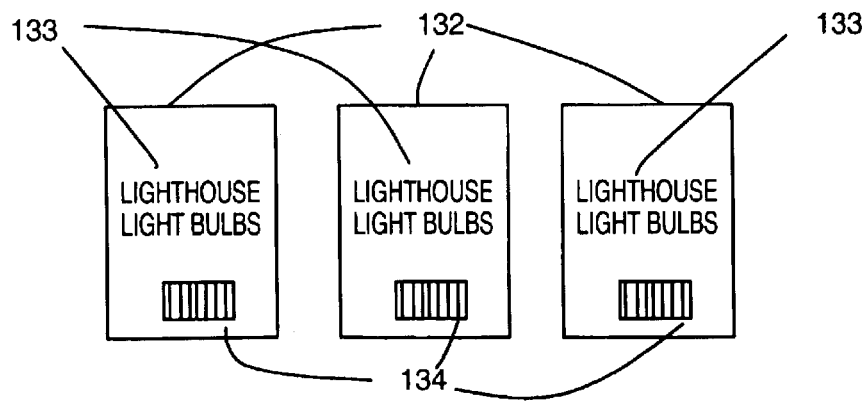

FIG. 8C shows an enlarged view of some of the boxes of light bulbs 132. Each box of light bulbs 132 has a common Universal Product Code (UPC) label 134, which is a group of parallel lines that encodes a number that uniquely identifies Lighthouse light bulbs. In other words, label 134 is different than labels of other products. Each box 132 also has a common character label 133. Character label 133 is "LIGHTHOUSE LIGHT BULBS." Label 133 is different than labels of other products.

Similarly, other product area in the store each have a set of respective products contiguously grouped together and a corresponding product station adjacent to the products. The respective units of a certain product have a common label, different than labels on units of other products, that uniquely identifies the certain product. Product area 140 has bottles of ketchup 142 contiguously grouped together. Product area 284 has loaves of bread 162 contiguously grouped together. Product area 170 has cartons of milk 172 contiguously grouped together. Product area 180 has packages of bacon 182. Product area of 191 has packages of butter 192 contiguously grouped together.

Product area 150 has boxes of cereal 152 contiguously grouped together.

Figure 9:
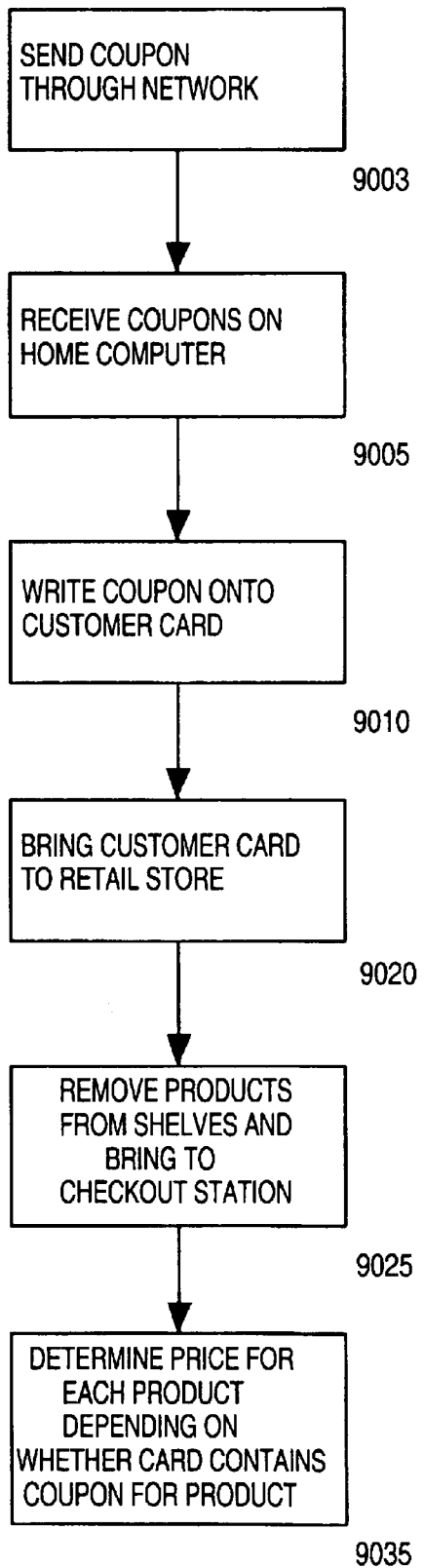
FIG. 9 is a flow chart of a processing performed in the preferred system.

FIG. 9 shows a processing performed in the preferred system. Computer 230 sends an electronic coupon, in the form of an E-mail message, through computer networks 115, 130, and 135. (Step 9003). A customer, such as customer 290, receives the electronic coupon, through modem 410, onto her home computer (step 9005), and writes the coupon onto her customer card 190 using writing device 415 (step 9010). The customer then brings her respective customer card to a store 1000. (step 9020).

At store 1000, the customer removes products from shelves 10, 20, and 30 and brings the products to checkout station 900 (step 9025). In other words, while shopping in store 1000, each of customers 210, 220, 231, 240, 250, 270, 280, and 290 carries his or her respective customer card. Customer 290 carries card 190, customer 220 carries card 225, customer 231 carries card 235, customer 240 carries card 245, customer 250 carries card 255, customer 270 carries card 275, customer 280 carries card 285, and customer 290 carries card 190. Each customer tows a shopping cart to hold selected products. Customer 210 tows cart 212, customer 220 tows cart 222, customer 231 tow cart 232, customer 240 tows cart 242, customer 250 tows cart 252, customer 270 tows cart 291, customer 280 tows cart 282, and customer 290 tows cart 292. The customer then removes a product from the shelf and places the removed product into her cart. The customer thus shops throughout the store.

Checkout station 900 then scans the products and determines a price for each product depending on whether the customer card contains coupons for the scanned product (step 9035). More specifically, the customer redeems the electronic coupons at the checkout area, by inserting her customer card into checkout station 915. For example, a customer such as customer 240 in FIG. 7B completes the purchase of her selected products 243 by transferring products 243 from her cart 242 to counter 900, and by inserting card 245 into checkout station 915. Subsequently, a checkout clerk (not shown) scans each selected product past UPC bar code reader 910. Bar code reader 910 is an optical detector. In other words, bar code reader 910 detects an electromagnetic signal. A processor coupled to station 915 and reader 910 determines whether the most recently scanned product is on a discount list stored in card 245. If the most recently scanned product is identified in this discount list, a price for the product is determined using the discount data corresponding to the product, and the resulting price is displayed on display 917. Checkout counter 900 scans and processes each product 243 in a similar manner.

Similarly customer 280 in FIG. 7B follows the procedure of FIG. 9 by transferring products 283 from her cart 282 to counter 900, and by inserting card 285 into checkout station 915; and the checkout clerk (not shown) scans each selected product 283 past UPC bar code reader 910. Customer 270 follows the procedure of FIG. 9 by transferring products 273 from her cart 291 to counter 900, and by inserting card 275 into checkout station 915; and the checkout clerk (not shown) scans each selected product 273 past UPC bar code reader 910.

Because of the large number of electronic coupons that may be available to a customer, a customer such as customer 310 may wish to insert their card into display station 710, to review what coupons are currently stored on the card. Station 710 may also present the viewer with additional information about the products identified by the coupons on the card. Station 710 is described in detail in application of KEN R. POWELL for SYSTEM AND METHOD FOR DISPLAYING PRODUCT INFORMATION IN A RETAIL SYSTEM, Ser. No. 08/603,483, filed on Feb. 20, 1996, now U.S. Pat. No. 5,890,135 issued Mar. 30, 1999, the contents of which is herein incorporated by reference.

Step 9005 includes a step of reading an electronic mail (Email) message. An Email message from computer 230, for the user of PC 400 in home 160, resides in an electronic mailbox 277, which is a memory area on computer 276. The user of PC 400 dials into computer 276 using a telephone line, submits appropriate user identification including a password, and then invokes a program that reads the Email message from the memory of computer 276 into the memory of PC 400.

The user then executes the driver for device 415, by printing the Email message to device "SCW:". The driver translates the textual coupon shown in FIG. 5 into a binary format, described below. Thus, the driver program and device 415 are essentially responsive to the coupon data stored in packet 3004, which was constructed by routing computer 238.

To prevent an unscrupulous user from repeatedly writing a single Email coupon onto a customer card, which would be contrary to the intent of the coupon issuer, the driver maintains a list of Email coupons already processed, including the time and date of the Email as shown in field 5010 of FIG. 5. Before writing an electronic coupon to a customer card, the driver compares the corresponding Email message to the list to verify that an identical coupon has not been processed.

Further, to prevent a user from changing the date and time field of a previously-printed Email message and reprinting the modified message to thwart this protection mechanism, each Email message from the coupon server on node 230 contains the encoded date and time in field 5020. Thus, the driver both verifies that an Email message with the date and time has not been previously processed, and verifies that the unencoded date and time in area 5010 matches the encoded date and time in field 5020.

There are two preferred methods for getting the Email address for PC 400 to the coupon server on node 230, to allow the server to send a coupon to PC 400. The first preferred method is to program the coupon server using data collected from sources off of the Internet. The second preferred method is to allow the user of PC 400 to send her Email address, through the computer networks, to node 230.

To implement this second method, it is presently preferred that the Email address for the user of PC 400 be sent by a web browser for the World Wide Web (WWW). With one scheme, a user sends an Email message requesting a coupon for a specific product, by invoking the browser to select Hypertext in a document advertising the product. Selection of the Hypertext invokes a "Form" in the document, causing the browser to prompt the user for her Email address, accept the Email address as keyboard input from the user, and construct an Email message addressed to the server on node 230. The message contains the Email address given by the user and data identifying the product corresponding to the selected hypertext. Upon receiving the message, the coupon server sends an Email message to the user's address.

Figure 19:
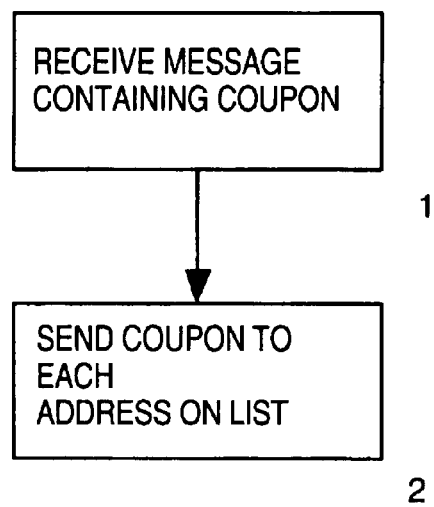
FIG. 19 is a flow chart of a possible processing in the preferred system.

An alternate scheme is to have the user of PC 400 join a club, by invoking the browser to select Hypertext in a document advertising the club. The club is essentially a mailing list for certain types of coupons. Selection of the hypertext invokes a Form in the document, causing the browser to prompt the user for her Email address, accept the Email address as keyboard input from the user, and construct an Email message addressed to the server on node 230. The message contains the Email address given by the user and data identifying the club corresponding to the selected hypertext. Upon receiving the message, the coupon server adds the Email address to the list for the club identified in the message. Subsequently, some event causes the coupon server to send a coupon to each address in the list. (FIG. 19).

One such event would be receipt, by the coupon server, of an Email message from a coupon issuer. (FIG. 19 step 1). The coupon issuer may be a distributor of the product corresponding to the coupon. The coupon server, in this case, acts as "mail exploder," and essentially echoes the single Email message from the coupon issuer to each member of the list. (FIG. 19 step 2).

Figures 10A, 10B:
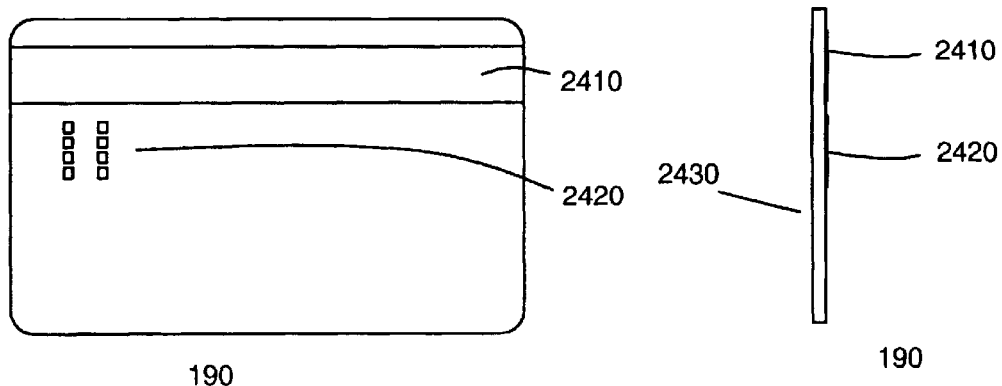
FIG. 10A is a plan view of one of the customer cards in the preferred system.
FIG. 10B is a side view of the card shown in FIG. 10A.

FIG. 10A shows a plan view of customer card 190, and FIG. 10B shows a side view of card 190. Card 190 is 8.5 cm by 5.4 cm, the length and width of a typical financial credit card. Card 190 is slightly thicker than a typical financial credit card. Card 190 includes a magnetic stripe 2410, interface contacts 2420 for communication with the product stations and the checkout station, and embossed area 2430 for displaying the card owner's name. Magnetic stripe 2410 allows a conventional credit card stripe reader to read basic data from the card. Magnetic stripe 2410 is not necessary to the operation of the preferred embodiment of the invention, described in more detail below.

Figure 10C:
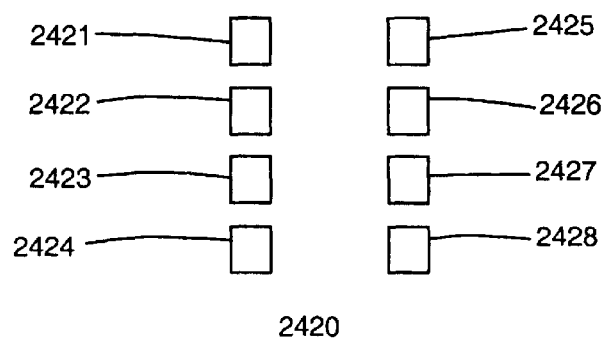
FIG. 10C is an enlarged, partial view of the card shown in FIG. 10A.

FIG. 10C shows interface contacts 2420 in more detail. Interface contacts 2420 are configured in accordance with ISO7816-2: 1988(E), Identification cards—Integrated circuit(s) cards with contact—Part 2: Dimensions and locations of the contacts, promulgated by the International Organization for Standardization (ISO), and available from the American National Standards Institute (ANSI), 11 West 42nd Street, New York, N.Y. 10036. According to ISO 7816-2, contact 2421 is assigned to VCC (supply voltage), contact 2422 is assigned to RST (reset signal), contact 2423 is assigned to CLK (clock signal), contact 2424 is reserved for future use, contact 2425 is assigned to GND (ground), contact 2426 is assigned to VPP (program and voltage), contact 2427 is assigned to I/O (data input/output), and contact 2428 is reserved for future use. Card 190 communicates with the product stations and the checkout stations through contact 2427 using a half duplex scheme, meaning that contact 2427 is for communicating data signals either to or from the card.

Figure 11:
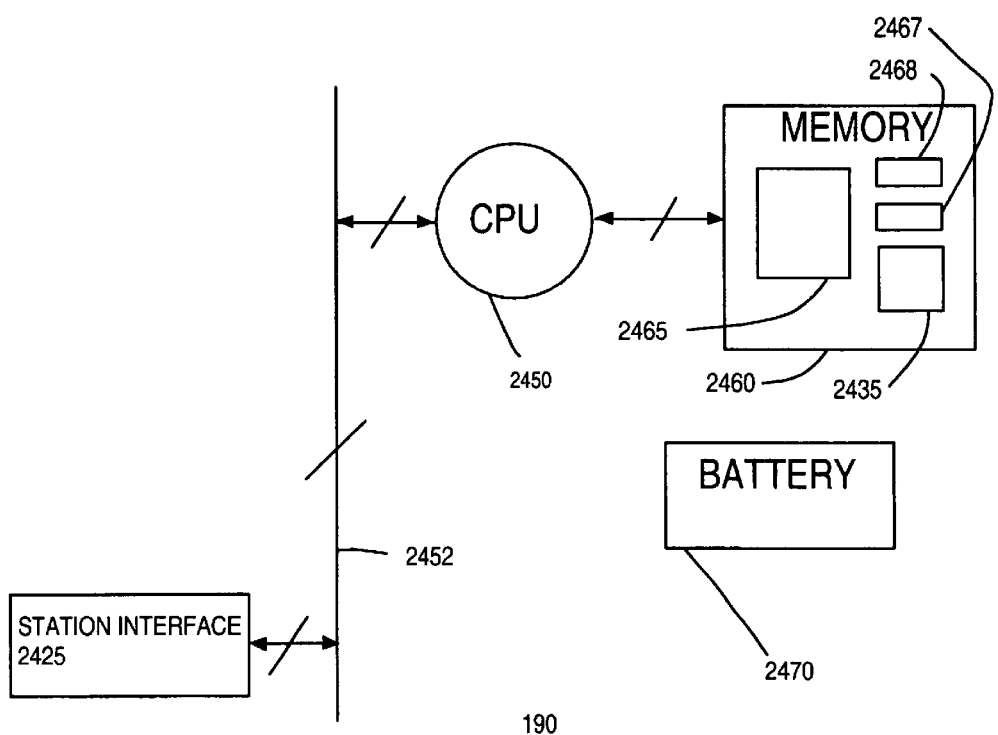
FIG. 11 is a block diagram of the customer card.

FIG. 11 is a block diagram of customer card 190, including central processing unit 2450, memory 2460, and battery 2470 for supplying power to interface 2425, processor 2450, and memory 2460. Memory 2460 is a random access, addressable device. Station interface 2425 includes a serial to parallel converter for transferring data signals between contact 2427 and CPU 2450 over parallel bus 2452. Memory 2460 stores a program 2465 executed by processor 2450, customer identification data 2467, and authorization data 2468. Customer identification data 2467 includes a sequence of digits that uniquely identifies the holder of the card. Customer identification data 2467 includes the card holder's social security number. For example, identification data 2467 in customer card 235 uniquely identifies customer 231. Authorization data 2468 also includes date data indicating an expiration date for the card. Authorization data 2468 also contains a field identifying that the card is a customer card.

Memory 2460 also stores electronic coupons in coupon list 2435. When a customer inserts a customer card into device 415, processor 2450 receives an identification code for the product from interface 415 and adds the code to the list 2435.

Each of customer cards 215, 225, 235, 245, 255, 275, 285, 315, 325, 335, 345, 355, 365, 367, 369, 375, and 385 has the same hardware structure as customer card 190.

Figure 12:
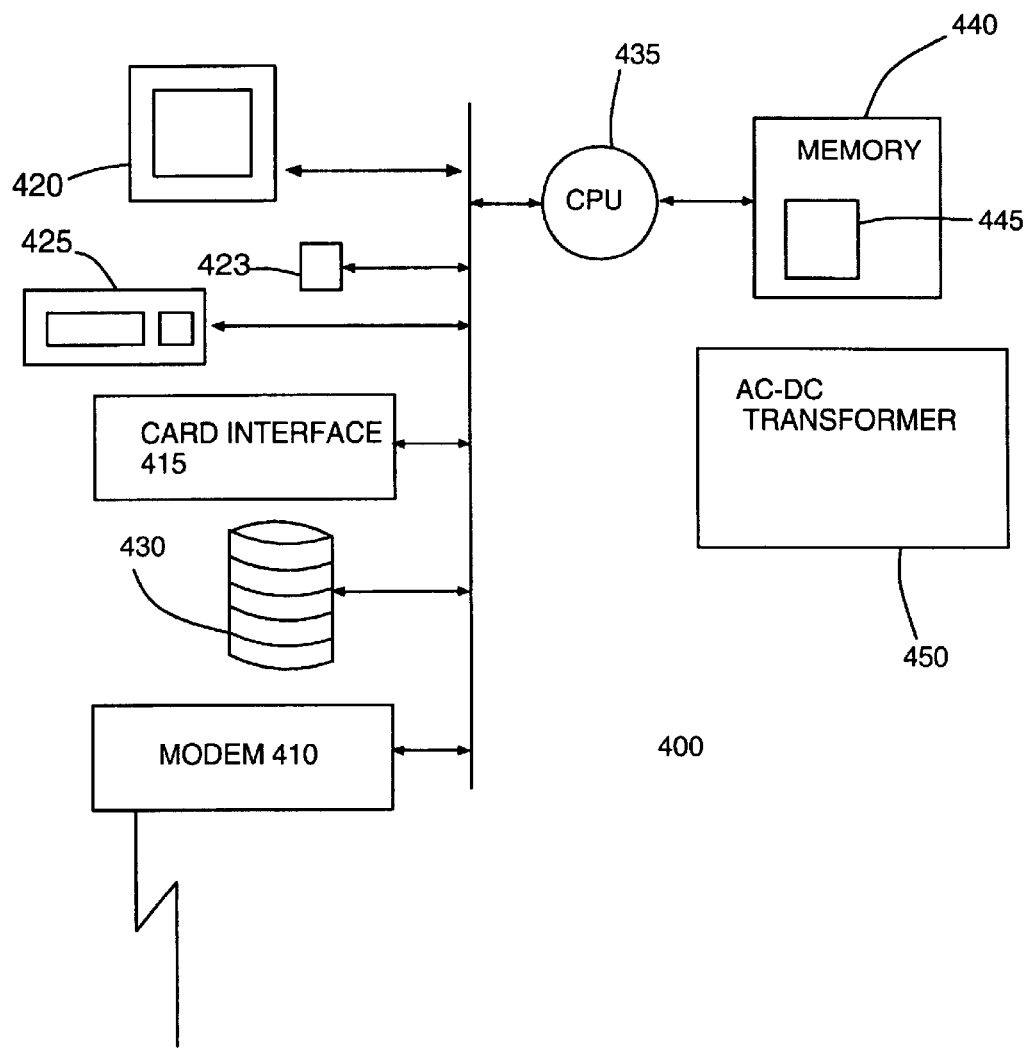
FIG. 12 is a block diagram of the personal computer shown in FIG. 4.

FIG. 12 shows a block diagram PC 400, including central processing unit 435, memory 440, and AC-DC transformer 450. Memory 440 is a random access, addressable device. Memory 440 stores driver program 445 for sending coupons to card-writing device 415. CPU 435 executes driver 445.

Figure 13:
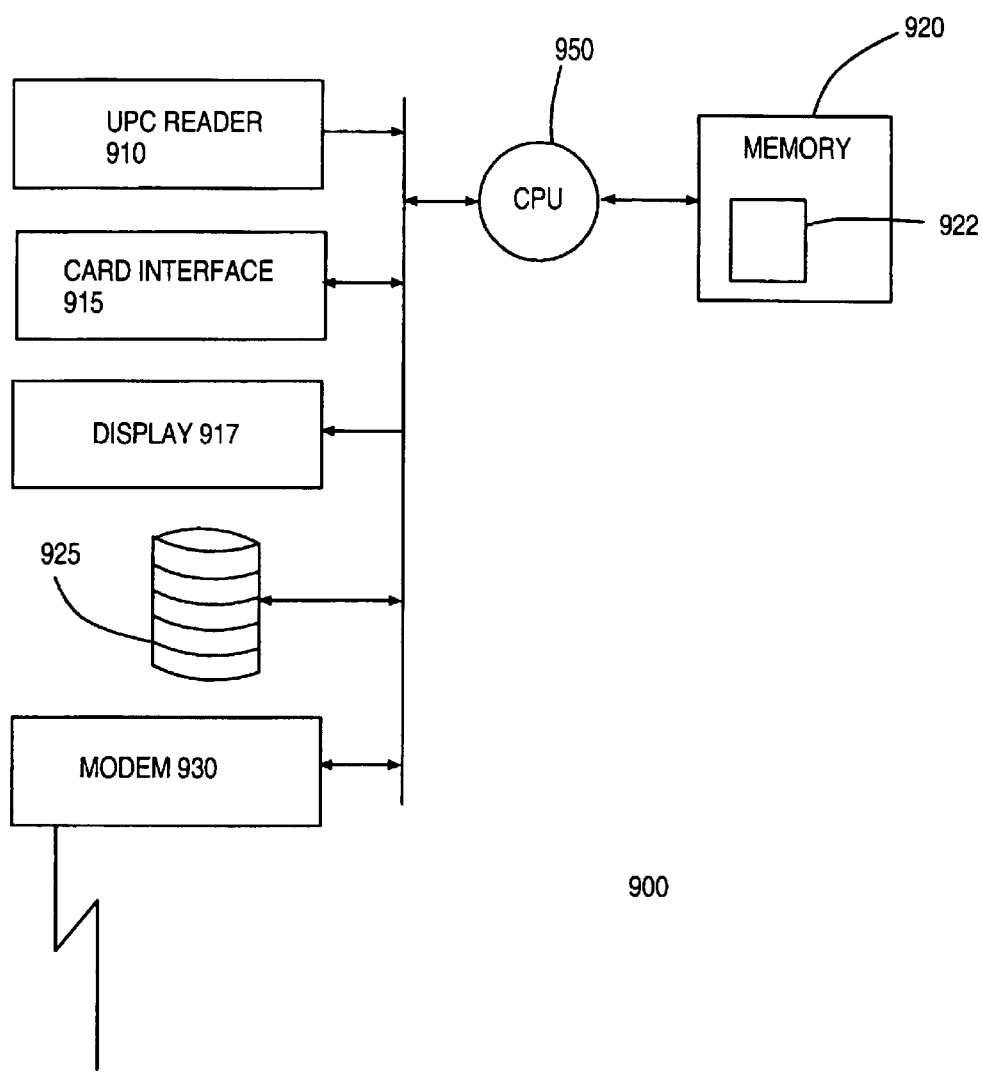
FIG. 13 is a block diagram of the check-out station shown in FIG. 7B.

FIG. 13 is a block diagram of checkout counter 900 shown in FIG. 7B. Disk 925 provides long term storage. CPU 950 executes instructions in random access, addressable memory 920. Checkout counter 900 also includes UPC reader 910 for reading bar codes on products, and checkout station 915 for communicating with a customer card. Since station 915 is in store 1000 and card-writing device 415 is in home 160, which is a separate building from store 1000, station 915 is spatially removed from card-writing device 415.

CPU 950 and program 922 act to detect a product scanned by UPC reader 910, determine a reference price for the product, search for the product's identification in the memory of a customer card, and deduct a discount from the reference price if the product is identified in the customer card memory. CPU 950 then displays the price of the product on display 917. In other words, CPU 950 and program 922 act to receive a purchase signal identifying a product, to receive to receive a card signal, and to determine a price for the product depending on whether the product identified by the card signal corresponds to the product identified by the purchase signal.

CPU 950 writes coupon redemption data onto disk 925. Periodically, CPU 950 sends the redemption data to an electronic clearing house through modem 930.

Figure 14:
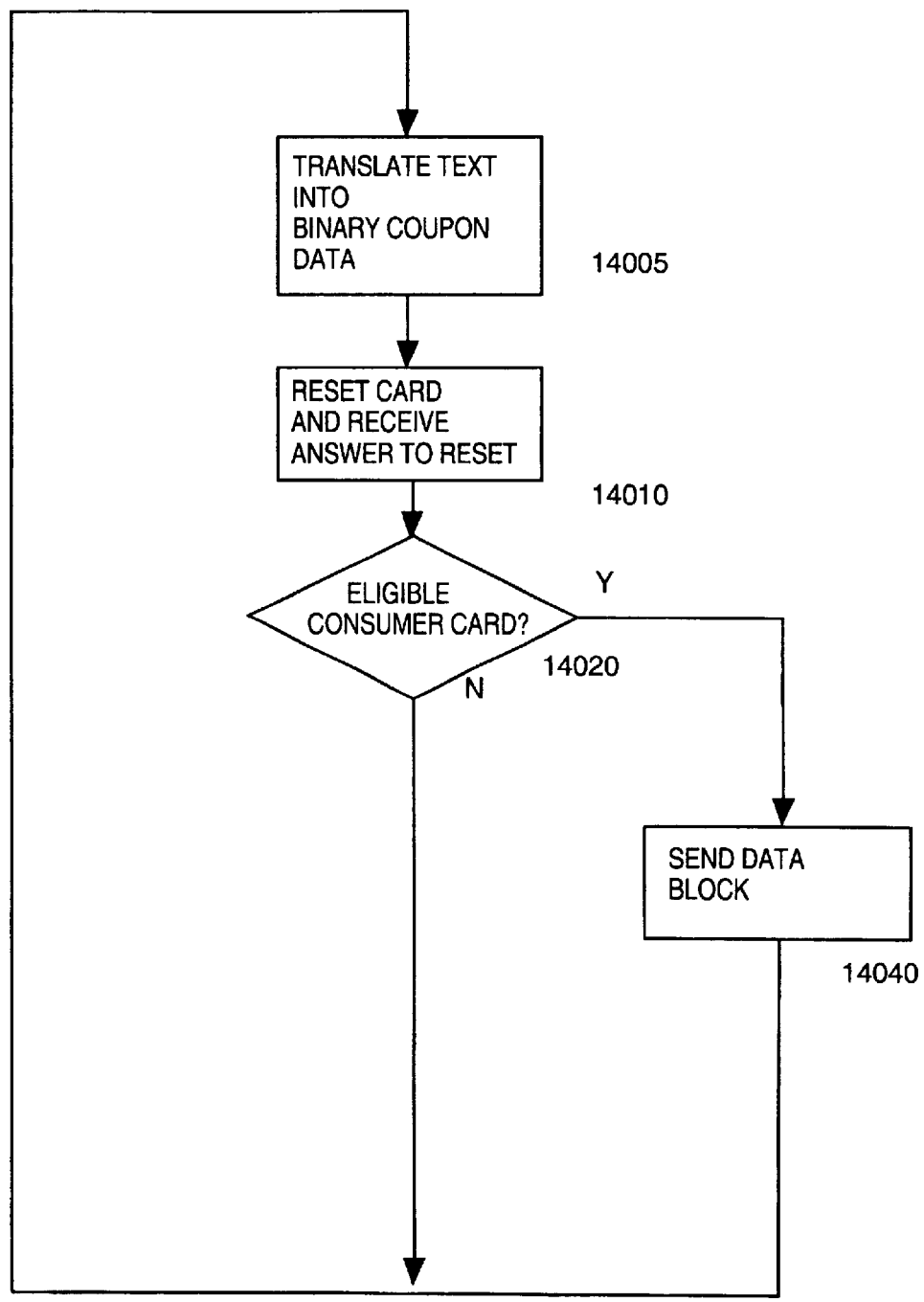
FIG. 14 is a flow chart of a step of the processing shown in FIG. 9.

FIG. 14 shows the processing of step 9010 of FIG. 9 in more detail. CPU 435 executes device driver program 445 in memory 440 to perform the processing shown in FIG. 14. When a person prints text to device "SCW:", device driver program 445 receives the text and verifies that identical text has not been processed before, by comparing the text received with a list of previous Email messages received. Program 445 also compares the time and date in field 5010 of the text with the encoded time and date in field 5020 of the text, to verify that the text is an authentic Email message from the coupon server on computer 230. If the Email message is an authentic message that has not been processed before, program 445 then translates the text in field 5020 into binary coupon data. (step 14005).

Subsequently, program 445 sends a reset command to card interface 415, causing interface 415 to reset the card by applying a clock signal to card contact 2423. (The card then answers the reset by sending an answer-to-reset data block, including identification data 2467 and authorization data 2468, through card contact 2427. Authorization data 2468 contains a card-type code indicating a customer card.) Program 445 then receives the answer-to-reset data block from card interface 415 (step 14010).

The communication protocol between interface 415 and a customer card is described in more detail in ISO/IEC 7816-3: 1989 (E), Identification cards—Integrated circuit(s) cards with contacts—Part 3: Electronic signals and transmission protocols; and ISO/IEC 7816-3: 1989/Amd.1: 1992 (E), Part 3: Electronic signals and transmission protocols, AMENDMENT 1: Protocol type technique=1, synchronous half duplex block transmission protocol. Both of these standards are promulgated by the International Organization for Standardization (ISO) and distributed by the American National Standards Institute (ANSI).

CPU 435 analyzes the authorization data in the received answer-to-reset block to determine whether the card is a customer card that is eligible to receive electronic coupons from interface 415 (step 14020). CPU 435 determines that the card is a customer card if the received authorization data contains a card-type code indicating a customer card. If the card is a customer card, meaning that the authorization data is authorization data 2468, CPU 435 determines if the card is eligible to receive electronic coupons if authorization data 2468 contains certain codes, and the date and time in Email field 5010 is not later than the date data in authorization data 2468. If the card is an eligible customer card, CPU 435 sends to the customer card a block containing a station-type code, indicating a PC interface, and the binary coupon data (step 14040). The binary coupon data includes an identification code for the product received from PC 400 (Old World Pasta 122) and the discount currently being offered for that product. If the card is not an eligible customer card (step 14020), there is no further processing.

FIG. 15A shows some the contents list 2435, starting at location 30 memory 2460, of customer card 190, before CPU 435 of PC 400 executes step 14040. An electronic coupon is represented by three rows in list 2435: a 10 digit UPC product code in the first row, discount format data in the second row ("1" signifying cents, "2" signifying percentage), and discount quantity data in the third row. In FIG. 15A, the customer card is storing two electronic coupons. After CPU 435 executes step 14040 (thereby sending another electronic coupon to the customer card), CPU 2450 in customer card 190 receives the data and adds the data to list 2435, resulting in three electronic coupons in list 2435 as shown in FIG. 15B.

In list 2435 in FIGS. 15A and 15B, the memory field having the product code 7170312350 corresponds to the UPC code on boxes of Lighthouse Light Bulbs 134. The next memory field stores the format of the discount quantity data, with "1" signifying cents and "2" signifying percentage in tenths of a percent. The next memory field stores the discount quality data, 200, signifying that the discount being offered for Lighthouse Light Bulbs 134 is $2.00. The memory field having the product code 7170312780 corresponds to the UPC code on ammonia bottles 112. The next memory field stores the format of the discount quantity data, with "1" signifying cents and "2" signifying percentage in tenths of a percent. The next memory field stores the discount quality data, 50, signifying that the discount being offered for ammonia bottles 112 is 50 cents. In list 2435 in FIG. 15B, the memory field having the product code 7170312682 corresponds to the UPC code on boxes of Old World Pasta 124. The next memory field stores the format of the discount quantity data, with "1" signifying cents and "2" signifying percentage in tenths of a percent. The next memory field stores the discount quality data, 150, signifying that the discount being offered for Old World Pasta 124 is $1.50.

Figure 16:
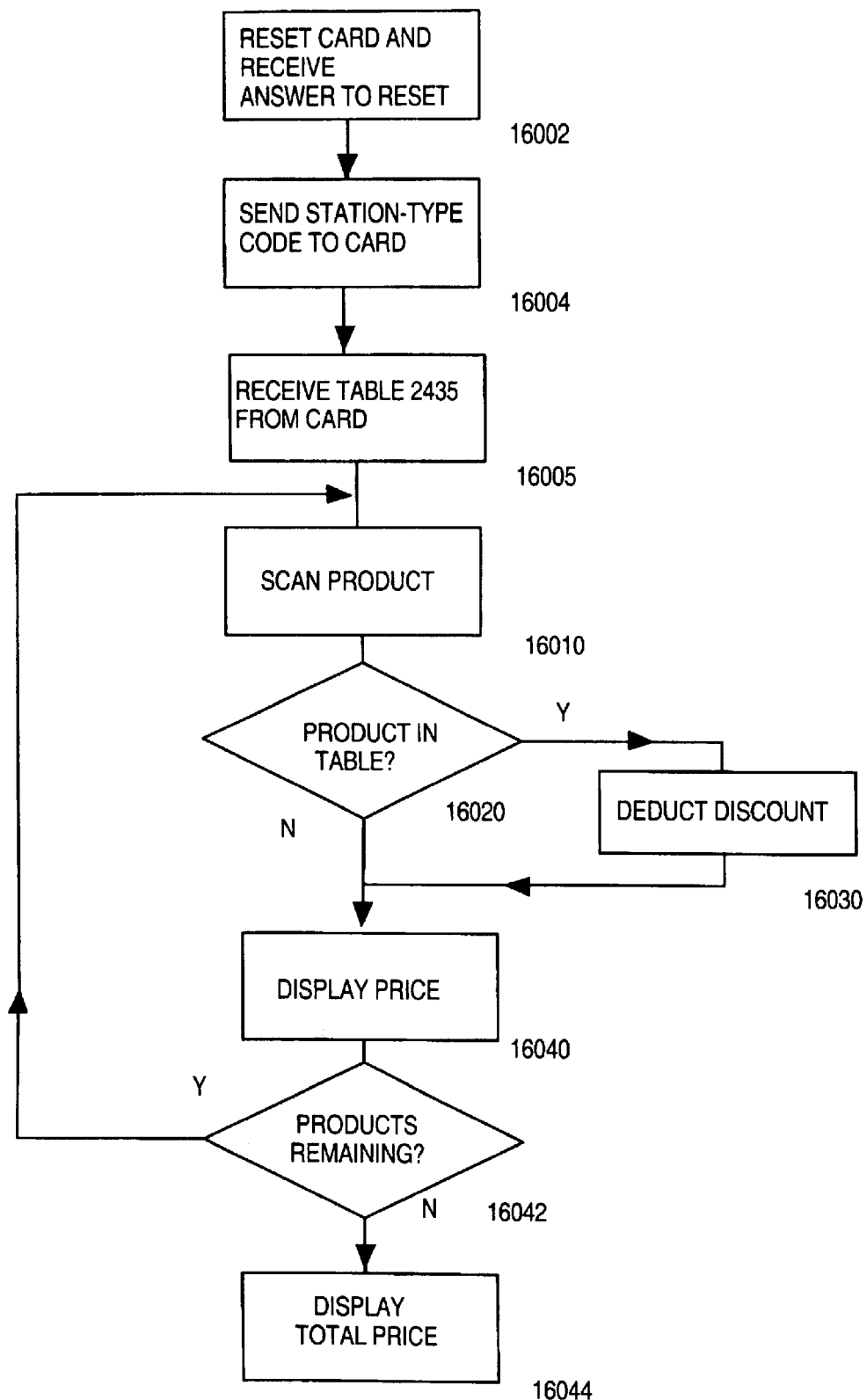
FIG. 16 is a flow chart of another step of the processing shown in FIG. 9.

FIG. 16 shows aspects of the processing of step 9035 of FIG. 9. The processing of FIG. 16 is processing performed by CPU 950 and program 922 in checkout counter 900, when a customer checks out of store 1000. When a customer, such as customer 290, inserts customer card 190 into interface slot 914, a switch (not shown) in interface slot 914 alerts CPU 950 that a card has been inserted into the slot. When a customer card is in interface slot 914, conductive contacts (not shown) inside interface slot 914 touch each card contact 2420. Subsequently, CPU 950 causes card interface 925 to reset the card by applying a clock signal to card contact 2423. (If the card is a customer card, the card then answers the reset by sending a block of data, including identification data 2467 and authorization data 2468, through card contact 2427.) CPU 950 then receives the answer-to-reset from the card (step 16002). CPU 950 then sends a data block containing a station-type code indicating a checkout station (step 16004). CPU 950 then receives the contents of table 2435 in memory 2460 of the customer card, and temporarily stores these table contents in memory 920 of the checkout station (step 16005). During step 16005, CPU 950 also causes customer card 190 to remove all entries from list 2435, so that the electronic coupons in the list cannot be redeemed again. When the checkout clerk (not shown) moves a product past UPC reader 910, UPC reader 910 detects the UPC code on the product and sends the UPC code to CPU 750 (step 16010). CPU 950 searches the received table contents to determine whether the product scanned is identified in the table (step 16020). If the product is not in the received table, CPU 950 displays the price (step 16040). If the product is in the received table, CPU 950 subtracts the discount, as determined by the discount data stored in the received table, from a product reference price read from disk 925 (step 16030), and displays the resulting price of the product on display 917 (step 16040). If there are products remaining (step 16042), processing proceeds to step 16010. If there are no products remaining, processing proceeds to step 16044 for display of the total price.

Product data, customer identification data 2467, authorization data 2468, and the data in list 2435 are each a type of signal.

In other words, the preferred retail system 1000 includes product areas 110, 120, 271, 140, 284, 170, 180, and, 191; a plurality of customer cards each having a memory, and a checkout counter 900 having checkout station 915 acting as a communication device. A method of operating system 1000 comprises the steps of writing a first signal into memory 2460 of a card in the plurality of cards, in response to a person inserting the card into the interface slot of a PC card interface, the first signal identifying a product; reading the first signal from memory 2460, in response to a person inserting the card into the interface slot of the checkout station; receiving another signal, from UPC reader 910, identifying a product; and determining a price for the product depending on whether the product identified by the first signal, read in the reading step, corresponds to the product identified by the other signal.

In summary, after UPC barcode reader 910 scans a product, processor 950 determines eligibility for a discount. If a product qualifies, processor 950 displays the discounted price on display 917.

Figure 17:
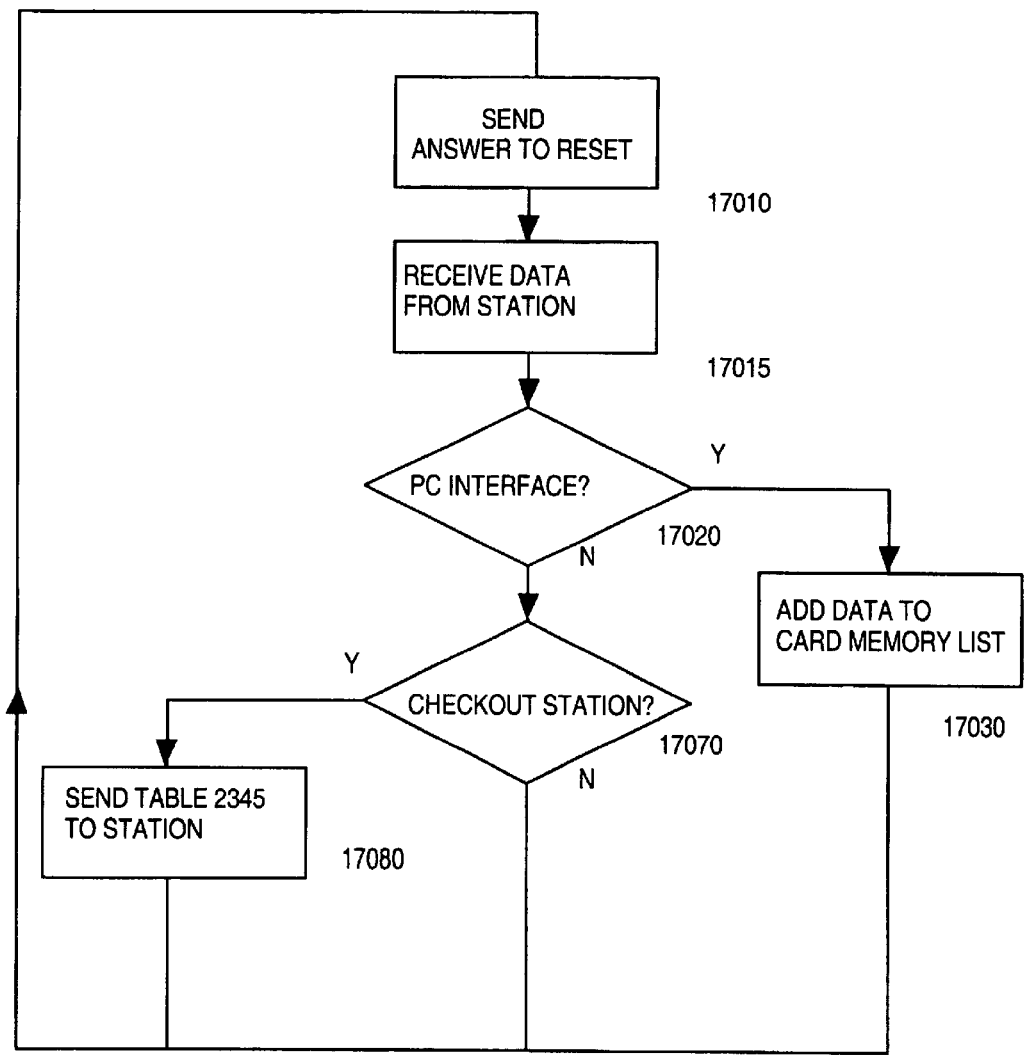
FIG. 17 is a flow chart of the processings of step 9010 and of step 9035 of FIG. 9.

FIG. 17 shows aspects of the processing of steps 9010 and 9035 of FIG. 9. The processing of FIG. 17 processing is performed by one of the customer cards, such as customer card 190, in the preferred retail system. After the card is reset through contacts 2420, the customer card sends an "answer to reset" data block in accordance with the ISO standard ISO/ICE 7816-3: 1989(E), cited above. The customer card sends identification data 2467 and authorization data 2468 in the answer-to-reset data block (step 17010). If the station then sends a block of data to the customer card, the customer card then receives the block of data through contact 2427 (step 17015). If the block contains a station-type code indicating a PC card interface (step 17020), the customer card then adds product coupon information, from a certain location in the block, to the list 2345 (step 17030).

If the customer card is not eligible, the PC interface will not send a block of data, step 17015 therefore does not execute, and processing ceases until the customer card is reinserted into an interface slot, at which time the station will reset the card and processing will restart at step 17010.

Alternatively, if the block contains a station-type code indicating a Checkout station (step 17070), the customer card then sends list 2345 to the display station (step 17080). In other words, CPU 2450 reads list 2435 from memory 2460, in response to a customer inserting card 190 into checkout station 915, and sends a signal corresponding to the list 2345 to the checkout station (step 17080).

Figure 18:
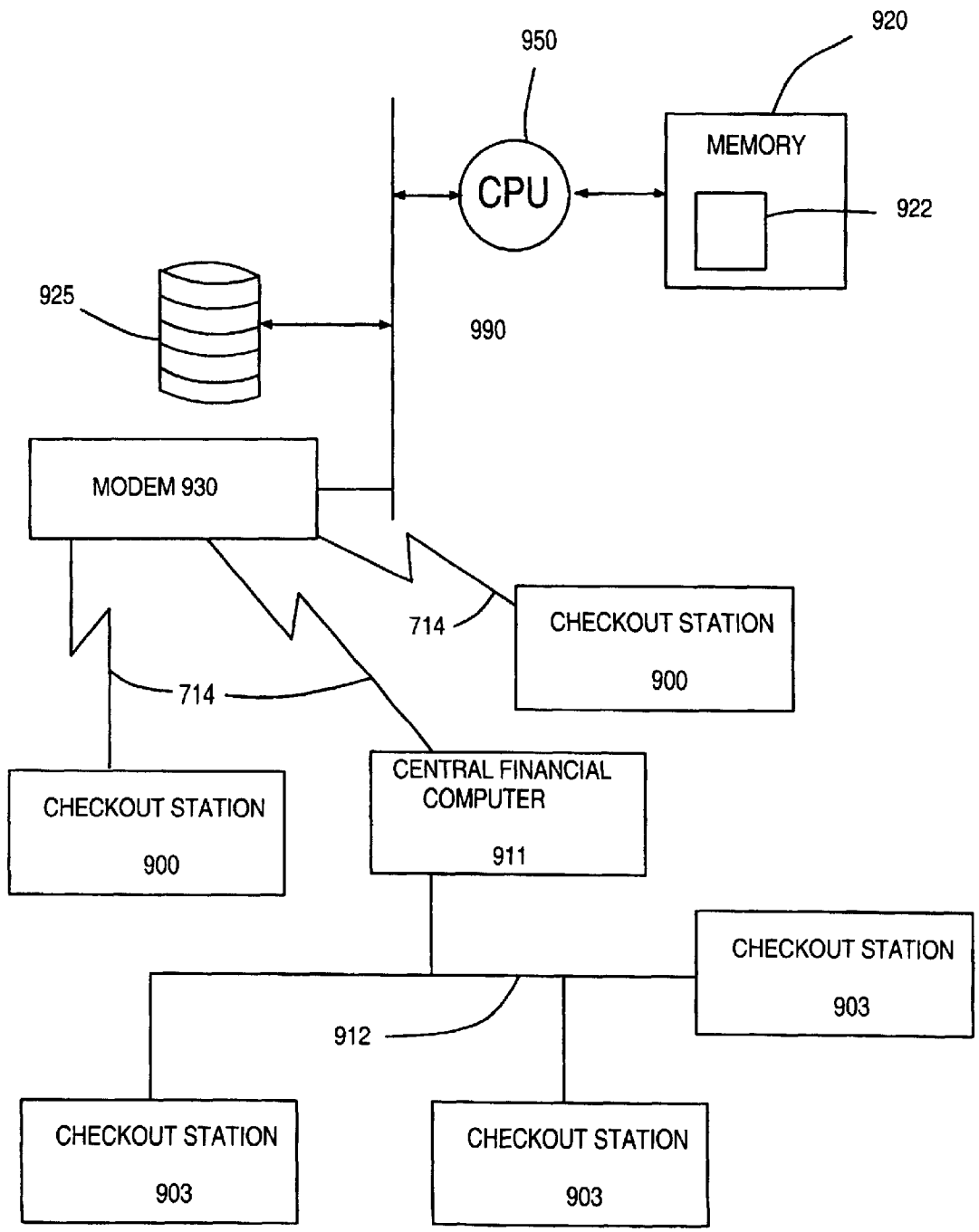
FIG. 18 is a block diagram of a system including a clearing house and multiple check-out stations.

FIG. 18 shows a block diagram of a preferred retail system including a clearinghouse 990, and a plurality of checkout stations 900. Periodically, checkout counter 900 sends redemption data to an electronic clearing house. The redemption data sent to the clearing house includes the identification of the store, identification of the coupons redeemed and of respective quantities of coupon redemptions. Periodically, checkout counter 900 sends redemption data to a market research center. The redemption data sent to the research center includes the identification of the store and of the customers who presented electronic coupons for redemption. The checkout stations send the redemption data blocks, over telephone signal paths 714.

Checkout stations 903 are located within a single company. Checkout stations 903 are similar to checkout stations 900, described above, except that checkout stations 903 have circuitry for communicating over network 912. Checkout stations 903 send transaction data blocks to central financial computer 911 located within the company. Central financial computer 911 periodically sends the compiled transaction data to clearing house 990, over telephone signal paths 714.

Thus, the preferred systems provides a convenient and stimulating shopping environment. The systems allow the user to receive electronic coupons at home and then bring the received coupons to a retail store.

Other applications of electronic coupons are the subject of copending application of KEN R. POWELL for RETAIL SYSTEM, Ser. No. 08/468,816, filed on Jun. 6, 1995, resulting in U.S. Pat. No. 6,105,002, the contents of which is herein incorporated by reference; of copending application of KEN R. POWELL for DEVICE AND METHOD OF PROGRAMMING A RETAIL SYSTEM, Ser. No. 08/468,820, filed on Jun. 6, 1995, now U.S. Pat. No. 5,727,153, the contents of which is herein incorporated by reference.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A processing system comprising:
    a first computer, the processing system being for a second system including second computer; a plurality of portable cards transported by consumers, each card containing an electronic memory; a plurality of homes; a store; and a routing system for receiving a signal and generating network addresses in response to an inter-network address in the received signal, the routing system including a plurality of wide area communication links,
    wherein the first computer includes circuitry for sending first signals to the routing system, each first signal including a signal corresponding to a product, and an inter-network address corresponding to the second computer, to cause the routing system to generate a plurality of network addresses, each of the plurality of network addresses corresponding to a respective computer in a respective computer network, and wherein the second computer includes circuitry for receiving first signals, and wherein the second system further includes:
    a plurality of first processors, each located in one of the plurality of homes, responsive to a signal corresponding to a product received by the second computer, for sending a memory signal to a portable card in the plurality of cards, the memory signal corresponding to the product; and
    a second processor, in the store, for receiving the memory signal from a portable card in the plurality of cards, to send a telecommunications signal out of the store via a telecommunications signal path.

2. The processing system of claim 1 wherein each card further contains a processing unit that executes a program stored in a random access memory.

3. The processing system of claim 1 wherein the telecommunications signal includes a signal identifying a consumer.

4. The processing system of claim 1 wherein the store includes
    a receiver for receiving a purchase signal corresponding to a product; and
    a determiner for determining a price for the product depending on whether the memory signal, received by the second processor, corresponds to the purchase signal.

5. The processing system of claim 4 wherein the store further includes
    an electromagnetic detector for generating the purchase signal.

6. The processing system of claim 4 wherein the store further includes
    a bar code reader for generating the purchase signal.

7. The processing system of claim 1 wherein each first processor includes a computer spatially removed from the second computer.

8. The processing system of claim 1 wherein the store includes
    means for generating a purchase signal with a bar code reader, the purchase signal corresponding to a product;
    a second receiver that receives a purchase signal; and
    means for determining a monetary amount depending on whether the memory signal corresponds to the purchase signal.

9. The processing system of claim 1 wherein each first signal is responsive to a request, each of the first processors includes a browser, and the processing system further includes a structure processed by the browser to generate a request.

10. The processing system of claim 9 wherein the structure includes a Form.

11. The processing system of claim 9 wherein the request includes an address.

12. The processing system of claim 9 wherein the address is an email address.

13. The processing system of claim 1 wherein each first signal is responsive to a request, and each of the first processors includes a browser, and the processing system further includes a first structure, selectable by a consumer, to cause the browser to invoke a second structure and generate a request.

14. The processing system of claim 13 wherein the first structure includes hypertext.

15. The processing system of claim 13 wherein the second structure includes a Form.

16. The processing system of claim 1 wherein each first signal is responsive to a request, and the processing system further includes a document advertising a product, the document including a structure, selectable by a consumer, to generate a request.

17. The processing system of claim 16 wherein the structure includes hypertext.

18. The processing system of claim 16 wherein the structure includes a Form.

19. The processing system of claim 1 wherein the processing system further includes a structure, selectable by a consumer, to add the consumer to a record of consumers that will receive signals corresponding to a product, responsive to a subsequent event.

20. The processing system of claim 19 wherein the subsequent event is a message from a coupon issuer.

21. The processing system of claim 20 wherein the message from the coupon issuer includes an email message.

22. The processing system of claim 19 wherein the structure includes hypertext.

23. The processing system of claim 19 wherein the structure includes a Form.

24. The processing system of claim 1 wherein the telecommunications signal includes a signal sent to a clearing house.

25. The processing system of claim 1 wherein the telecommunications signal includes a signal sent to a market research center.

26. In a system including a store; a plurality of portable cards each containing an electronic memory; a plurality of homes; and a routing system for receiving a signal and generating a routing signal in response to an inter-network address in the received signal, the routing system including a plurality of wide area communication links, a method comprising:

sending first signals from a first computer to the routing system, each first signal including a signal corresponding to a product, and an inter-network address corresponding to a second computer, to cause the routing system to generate a plurality of routing signals, each of the plurality of routing signals corresponding to a respective portion of a signal path between the first and second computers;

receiving a signal corresponding to a product, sent in the previous step, and the step, performed in one of the homes, of sending, responsive to the signal received in the previous step, a memory signal to a portable card in the plurality of cards, the memory signal corresponding to the product, and the step of subsequently, moving the portable card to the store, and the step, performed in the store, of receiving the memory signal from the portable card, to send a telecommunications signal out of the store via a telecommunications signal path.

27. The method of claim 26 further including executing a program stored in a random access memory in the portable card.

28. The method of claim 26 further including sending, in the telecommunications signal, a signal identifying a consumer.

29. The method of claim 26 further including the steps, performed in the store, of receiving a purchase signal corresponding to a product; and determining a price for the product depending on whether the memory signal corresponds to the purchase signal.

30. The method of claim 26 further including the steps, performed in the store, of generating a purchase signal with an electromagnetic detector, the purchase signal corresponding to a product;

receiving the purchase signal; and determining a price for the product depending on whether the memory signal corresponds to the purchase signal.

31. The method of claim 26 further including the steps, performed in the store, of generating a purchase signal with a bar code reader, the purchase signal corresponding to a product;

receiving a purchase signal; and determining a price for the product depending on whether the memory signal corresponds to the purchase signal.

32. The method of claim 26 wherein each first signal is responsive to a request, and the method further includes processing a structure with a browser, to generate a request.

33. The method of claim 32 wherein the structure includes a Form.

34. The method of claim 32 wherein the request includes an address.

35. The method of claim 34 wherein the address is an email address.

36. The method of claim 26 wherein each first signal is responsive to a request, the system further includes a browser, and the method further includes selecting a first structure to cause the browser to invoke a second structure and generate a request.

37. The method of claim 36 wherein the first structure includes hypertext.

38. The method of claim 36 wherein the second structure includes a Form.

39. The method of claim 26 wherein each first signal is responsive to a request, the system further includes a document advertising a product, and the method further includes selecting a structure in the document to generate a request.

40. The method of claim 39 wherein the structure includes hypertext.

41. The method of claim 39 wherein the structure includes a Form.

42. The method of claim 26 further including selecting a structure to add a consumer to a record of consumers that will receive signals corresponding to a product, responsive to a subsequent event.

43. The method of claim 42 wherein the subsequent event is a message from a coupon issuer.

44. The method of claim 43 wherein the message from the coupon issuer includes an email message.

45. The method of claim 42 wherein the structure includes hypertext.

46. The method of claim 42 wherein the structure includes a Form.

47. The method of claim 26 wherein the telecommunications signal includes a signal to a clearing house.

48. The method of claim 26 wherein the step of receiving a signal corresponding to a product is performed in the one of the homes.

49. A processing system for a second system including a first computer; a second computer; a plurality of portable cards each containing an electronic memory; a plurality of homes; a store with a first receiver that receives signals from the plurality of portable cards to send a telecommunications signal out of the store via a telecommunications signal path; and a routing system for receiving a signal and generating a routing signal in response to an inter-network address in the received signal, the routing system including a plurality of wide area communication links, the processing system comprising:

circuitry, in the first computer, that sends first signals to the routing system, each first signal including a signal corresponding to a product, and an inter-network address corresponding to the second computer, to cause the routing system to generate a plurality of routing signals, each of the plurality of routing signals corresponding to a respective portion of a signal path between the first and second computers, thereby enabling the second computer to receive the first signals, wherein the second system further includes a plurality of home computers, each located in one of the plurality of homes, responsive to the signal corresponding to a product, from one of the first signals received by the second computer, for sending a memory signal to a portable card in the plurality of cards, the memory signal corresponding to the product.

50. The processing system of claim 49 wherein each card further contains a processing unit that executes a program stored in a random access memory.

51. The processing system of claim 49 wherein the telecommunications signal includes a signal identifying a consumer.

52. The processing system of claim 49 further including
   a second receiver that receives a purchase signal corresponding to a product; and
   a determiner for determining a monetary amount depending on whether the memory signal, received by the first receiver, corresponds to the purchase signal.

53. The processing system of claim 49 further including an electromagnetic detector for generating the purchase signal.

54. The processing system of claim 49 further including a bar code reader for generating the purchase signal.

55. The processing system of claim 49 wherein each first signal is responsive to a request, each of the home computers includes a browser, and the processing system further includes a structure processed by the browser to generate a request.

56. The processing system of claim 55 wherein the structure includes a Form.

57. The processing system of claim 55 wherein the request includes an address.

58. The processing system of claim 57 wherein the address is an email address.

59. The processing system of claim 49 wherein each first signal is responsive to a request, each of the home computers includes a browser, and the processing system further includes a first structure, selectable by a consumer, to cause the browser to invoke a second structure and generate a request.

60. The processing system of claim 59 wherein the first structure includes hypertext.

61. The processing system of claim 59 wherein the second structure includes a Form.

62. The processing system of claim 61 wherein the structure includes hypertext.

63. The processing system of claim 61 wherein the structure includes a Form.

64. The processing system of claim 49 wherein each first signal is responsive to a request, and the processing system further includes a document advertising a product, the document including a structure, selectable by a consumer, to generate a request.

65. The processing system of claim 49 wherein the processing system further including a structure, selectable by a consumer, to add the consumer to a record of consumers that will receive signals corresponding to a product, responsive to a subsequent event.

66. The processing system of claim 65 wherein the subsequent event is a message from a coupon issuer.

67. The processing system of claim 66 wherein the message from the coupon issuer includes an email message.

68. The processing system of claim 65 wherein the structure includes hypertext.

69. The processing system of claim 65 wherein the structure includes a Form.

70. The processing system of claim 49 wherein the telecommunications signal includes a signal to a clearing house.

71. The processing system of claim 49 wherein the telecommunications signal includes a signal to a market research center.

72. In a system including a store, a plurality of portable cards each containing an electronic memory, a plurality of homes and a routing system for receiving a signal and generating a routing signal in response to an inter-network address in the received signal, the routing system including a plurality of wide area communication links, a method comprising:
   sending, from a first computer, a first signal to the routing system, the first signal including a signal corresponding to a product, and an inter-network address corresponding to a second computer, to cause the routing system to generate a plurality of routing signals, each of the plurality of routing signals corresponding to a respective portion of a signal path between the first and second computers, thereby enabling the second computer to receive the first signal; and
   the step, performed in one of the homes, of
      sending, responsive to the signal corresponding to a product received by the second computer, a memory signal to a portable card in the plurality of cards, the memory signal corresponding to the product, and the step of
   subsequently, moving the portable card to the store, and the step, performed in the store, of
      receiving the memory signal from the portable card, to send a telecommunications signal out of the store via a telecommunications signal path.

73. The method of claim 72 further including executing a program stored in a random access memory in the portable card.

74. The method of claim 72 further including sending, in the telecommunications signal, a signal identifying a consumer.

75. The method of claim 72 further including the steps, performed in the store, of
   receiving a purchase signal corresponding to a product; and
   determining a monetary amount depending on whether the memory signal corresponds to the purchase signal.

76. The method of claim 72 further including the steps, performed in the store, of
   generating a purchase signal with an electromagnetic detector, the purchase signal corresponding to a product;
   receiving the purchase signal; and
   determining a monetary amount depending on whether the memory signal corresponds to the purchase signal.

77. The method of claim 72 further including the steps, performed in the store, of
   generating a purchase signal with a bar code reader, the purchase signal corresponding to a product;
   receiving a purchase signal; and
   determining a monetary amount depending on whether the memory signal corresponds to the purchase signal.

78. The method of claim 72 wherein the first signal is responsive to a request, and the method further includes processing a structure with a browser, to generate a request.

79. The method of claim 78 wherein the structure includes a Form.

80. The method of claim 78 wherein the request includes an address.

81. The method of claim 80 wherein the address is an email address.

82. The method of claim 72 wherein the first signal is responsive to a request, the system further includes a browser, and the method further includes selecting a first structure to cause the browser to invoke a second structure and generate a request.

83. The method of claim 82 wherein the first structure includes hypertext.

84. The method of claim 82 wherein the second structure includes a Form.

85. The method of claim 72 wherein the first signal is responsive to a request, the system further includes a document advertising a product, and the method further includes selecting a structure in the document to generate a request.

86. The method of claim 85 wherein the structure includes hypertext.

87. The method of claim 85 wherein the structure includes a Form.

88. The method of claim 72 further including selecting a structure to add a consumer to a record of consumers that will receive signals corresponding to a product, responsive to a subsequent event.

89. The method of claim 88 wherein the subsequent event is a message from a coupon issuer.

90. The method of claim 89 wherein the message from the coupon issuer includes an email message.

91. The method of claim 88 wherein the structure includes hypertext.

92. The method of claim 88 wherein the structure includes a Form.

93. The method of claim 72 wherein the telecommunications signal includes a signal to a clearing house.

94. The method of claim 72 wherein the telecommunications signal includes a signal to a market research center.

* * * * *